United States Patent
Manolakos et al.

(10) Patent No.: US 12,262,443 B2
(45) Date of Patent: Mar. 25, 2025

(54) INTERACTION OF THE WAKE-UP SIGNAL (WUS) WITH DOWNLINK POSITIONING REFERENCE SIGNAL (PRS) RECEPTION IN A WIRELESS NETWORK

(71) Applicant: QUALCOMM Incorporated, San Diego, CA (US)

(72) Inventors: Alexandros Manolakos, Escondido, CA (US); Weimin Duan, San Diego, CA (US); Wanshi Chen, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 17/791,864

(22) PCT Filed: Dec. 18, 2020

(86) PCT No.: PCT/US2020/066008
§ 371 (c)(1),
(2) Date: Jul. 8, 2022

(87) PCT Pub. No.: WO2021/154420
PCT Pub. Date: Aug. 5, 2021

(65) Prior Publication Data
US 2023/0041767 A1    Feb. 9, 2023

(30) Foreign Application Priority Data

Jan. 31, 2020   (GR) .............................. 20200100051

(51) Int. Cl.
| | | |
|---|---|---|
| *H04W 76/28* | (2018.01) | |
| *H04L 5/00* | (2006.01) | |
| *H04W 52/02* | (2009.01) | |

(52) U.S. Cl.
CPC .......... *H04W 76/28* (2018.02); *H04L 5/0051* (2013.01); *H04W 52/0229* (2013.01)

(58) Field of Classification Search
CPC . H04W 76/28; H04W 24/08; H04W 52/0229; H04W 52/0251; H04W 52/0216;
(Continued)

(56) References Cited

U.S. PATENT DOCUMENTS

| | | | |
|---|---|---|---|
| 8,644,875 B2 * | 2/2014 | Kiukkonen et al. .......... 455/522 |
| 9,872,252 B1 * | 1/2018 | Ang et al. ......... H04W 52/0235 |

(Continued)

FOREIGN PATENT DOCUMENTS

| | | | | |
|---|---|---|---|---|
| CA | 2671504 A1 * | 5/2008 | ............ H04W 52/02 |
| CA | 3074758 A1 * | 6/2019 | ............ H04W 76/28 |

(Continued)

OTHER PUBLICATIONS ((WO 2013102389 A1) >>> Discontinuous Reception Method and Device (see title) (Year: 2013).*
(Continued)

*Primary Examiner* — Meless N Zewdu
(74) *Attorney, Agent, or Firm* — Procopio, Cory, Hargreaves & Savitch LLP/Qualcomm

(57) ABSTRACT

A user equipment (UE) operating in a discontinuous reception (DRX) mode may receive a wake-up signal indicating that the UE may skip the next ON duration of the DRX cycle, i.e., the UE is instructed to not wake up during a next ON time during the DRX cycle to monitor communication signals, such as data signals or control signals. The UE may be configured to receive downlink (DL) positioning refer-
(Continued)

ence signals (PRSs), e.g., during the next ON duration of the DRX cycle. The UE respond to the PRS configuration and the wake-up signal by remaining in DRX sleep mode and not receiving the PRS or transitioning to DRX ON mode to receive the PRS during which the UE may monitor or not monitor communication signals. The location server may receive indications of the wake-up signal configuration and status from a base station or the UE.

46 Claims, 14 Drawing Sheets

(58) Field of Classification Search
CPC ..... H04W 64/00; H04W 76/00; H04W 76/10; H04W 76/11; H04W 76/20; H04W 52/00; H04W 52/02; H04W 88/00; H04W 88/02; H04W 88/08; H04L 5/0051; H04L 5/00; H04L 5/02; H04L 1/0044; H04L 1/0053; H04L 67/145; H04L 2025/03796; H04L 41/34; H04L 2025/03783; H04L 41/16; Y02D 30/70; G06K 15/406; G06K 15/4055; G08B 21/023; G08B 21/0227
See application file for complete search history.

(56) References Cited

U.S. PATENT DOCUMENTS

| | | | |
|---|---|---|---|
| 11,284,477 B2* | 3/2022 | Islam et al. | H04W 88/06 |
| 11,350,363 B2* | 5/2022 | Ljung et al. | H04W 52/0229 |
| 2006/0195576 A1* | 8/2006 | Rinne et al. | 709/228 |
| 2007/0064662 A1* | 3/2007 | Bultan et al. | 370/338 |
| 2007/0291729 A1* | 12/2007 | Dalsgaard et al. | 370/347 |
| 2008/0090573 A1* | 4/2008 | Kim et al. | 455/436 |
| 2013/0045770 A1* | 2/2013 | Aschan et al. | 455/522 |
| 2013/0194990 A1* | 8/2013 | Banister et al. | 370/311 |
| 2014/0301373 A1* | 10/2014 | Cili et al. | H04W 76/048 |
| 2015/0181641 A1* | 6/2015 | Farajidana et al. | H04W 76/048 |
| 2015/0230112 A1 | 8/2015 | Siomina et al. | |
| 2015/0245295 A1* | 8/2015 | Jha et al. | H04W 52/0241 |
| 2017/0181218 A1* | 6/2017 | Liu et al. | H04W 76/048 |
| 2017/0339744 A1* | 11/2017 | Latheef et al. | H04W 76/048 |
| 2018/0098287 A1 | 4/2018 | Ang et al. | |
| 2018/0146430 A1* | 5/2018 | Yadav et al. | H04W 52/0254 |
| 2018/0234920 A1* | 8/2018 | Bae | H04W 52/0225 |
| 2018/0343132 A1* | 11/2018 | Maheshwari et al. | H04L 12/16 |
| 2018/0343686 A1* | 11/2018 | Manepalli et al. | H04W 76/048 |
| 2019/0053158 A1 | 2/2019 | Kumar et al. | |
| 2019/0182794 A1 | 6/2019 | Wong et al. | |
| 2019/0254013 A1 | 8/2019 | Chang et al. | |
| 2019/0313331 A1* | 10/2019 | Zhang et al. | H04W 52/0225 |
| 2019/0327673 A1 | 10/2019 | Bitra et al. | |

FOREIGN PATENT DOCUMENTS

| | | | | |
|---|---|---|---|---|
| CN | 109842937 | A | 6/2019 | |
| CN | 110337830 | A | 10/2019 | |
| TW | 201106742 | A | 2/2011 | |
| WO | WO 2013149666 | A1 * | 10/2013 | H04W 68/02 |
| WO | 2018204799 | A1 | 11/2018 | |
| WO | 2019134643 | A1 | 7/2019 | |
| WO | 2019209750 | A1 | 10/2019 | |
| WO | 2020008636 | A1 | 1/2020 | |
| WO | WO-2020237446 | A1 | 12/2020 | |
| WO | WO-2021029934 | | 2/2021 | |

OTHER PUBLICATIONS (CN 104684050 A) >>> A Discontinuous Reception Control Method And Device (see title) (Year: 2015).*
(WO 2020007313 A1) >>> Method and Device for Configuring and Receiving Positioning Reference Signal (see title) (Year: 2020).*

Taiwan Search Report—TW109145580—TIPO—Jan. 21, 2024.
3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/Specs/archive/38_series/38.213/38213-g00.zip 38213-g00.docx [retrieved on Jan. 14, 2020], section 7.6.2, Section 10, Section 10.1, p. 100, Section 10.3, Paragraph [09.1], clause 7.2.1, p. 23-p. 25, clause 9, p. 49, paragraph 3 clause 9.1, p. 49, paragraph 4—paragraph 15 clause 9.1.1, p. 50, paragraph 5—paragraph 6 clause 9.1.2.1, p. 55 clause 9.1.3, p. 57, paragraph 8 clause 9.1.3.1, p. 61, paragraph 1—paragraph 2 clause 9.1.3.2, p. 63, paragraph 6, clause 9.1.3.3, p. 64, paragraph 1-p. 65, paragraph 10, p. 56. paragraph 6-p. 57, paragraph 1 ch, 9.2.3, p. 73, paragraph 5, p. 44, paragraph 8, p. 10, paragraph 1, p. 105-p. 106, tables 10.2-1. 10.2-2, paragraph [9.2.5].
"3rd Generation Partnership Project; Technical Specification Group Radio Access Network; NR; Physical Layer Procedures for Data (Release 16)", 3GPP Standard, Technical Specification, 3GPP TS 38.214, 3rd Generation Partnership Project (3GPP), Mobile Competence Centre, 650, Route Des Lucioles, F-06921, Sophia-Antipolis Cedex, France, vol. RAN WG1, No. V16.0.0, Dec. 2019, Jan. 14, 2020 (Jan. 14, 2020), XP051860777, pp. 1-147, Retrieved from the Internet: URL: http://ftp.3gpp.org/Specs/archive/38_series/38.214/38214-g00.zip, 38214-g00.docx [retrieved on Jan. 14, 2020] Sections 5.1.6.1-5.1.6.1.1, 5.1.6.3, 5.1.6.5, 5.2.1.2, 5.2.1.4 and 5.2.25, paragraphs [5.2.1.5], [5.2.2], paragraph 5.2.1 .6, paragraph 5.4, paragraph 6.1, paragraph 5.1.6.1.2, paragraph 5.2.1.4.4, Section 5.1.3.2, p. 28-p. 31, Section 6 .1.4.2, p. 122-p. 123.
International Search Report and Written Opinion—PCT/US2020/066008—ISA/EPO—Apr. 13, 2021.
Mediatek Inc: "Efficient and Low Latency SCell Data Transmission for NR CA", 3GPP Draft, 3GPP TSG RAN WG1 Meeting RAN1 #99, R1-1912101, 3rd Generation Partnership Project (3GPP), Mobile Competence Centre, 650, Route Des Lucioles, F-06921, Sophia-Antipolis Cedex, France, vol. RAN WG1, No. Reno, U.S.A. Nov. 18, 2019-Nov. 22, 2019, Nov. 9, 2019 (Nov. 9, 2019), XP051823194, 15 pages, Retrieved from the Internet: URL: https://ftp.3gpp.org/tsg_ran/WG1_RL1/TSGR1_99/Docs/R1-1912101.zip R1-1912101_Efficient and low latency SCell data transmission for NR CA_20191108.docx [retrieved on Nov. 9, 2019] section 2.4 and 4.
Mediatek Inc: "Ramaining Details on Power Saving Signal", 3GPP Draft, 3GPP TSG RAN WG1 Meeting #99, R1-1912095, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 18, 2019-Nov. 22, 2019, Nov. 9, 2019 (Nov. 9, 2019), XP051823188, 12 Pages, Retrieved from the Internet: URL: https://ftp.3gpp.org/tsg_ran/WG1_RL1/TSGR1_99/Docs/R1-1912095.zip R1-1912095 Remaining details on power saving signal final.docx [retrieved on Nov. 9, 2019], Sections 2.3-3.1.3 and 4, pp. 4. 6.7.
Qualcomm Incorporated: "On DL PRS RSTD Measurements in NR Positioning", 3GPP Draft, 3GPP TSG-RAN WG4 Meeting #92-Bis, R4-1912347—ON DL PRS RSTD Measurements in NR Positioning, 3rd Generation Partnership Project (3GPP), Mobile Competence Centre, 650, Route Des Lucioles, F-06921, Sophia-Antipolis Cedex, France, vol. RAN WG4, No. Chongqing, China; Oct. 14, 2019-Oct. 18, 2019, Oct. 4, 2019 (Oct. 4, 2019), XP051807074, 6 pages, Retrieved from the Internet: URL: https://ftp.3gpp.org/tsg_ran/WG4_Radio/TSGR4_92Bis/Docs/R4-1912347.zip R4-1912347—On DL PRS RSTD measurements in NR positioning.docx [retrieved on Oct. 4, 2019] Sections 2-4, 6 and 7.
"RAN4 #92-Bis Meeting Report", 3GPP Draft, 3GPP TSG-RAN WG4 Meeting #93, RAN4_92BIS_RD_CHAIRMAN_REPORT_10_FRI_EOM, 3rd Generation Partnership Project (3GPP), Mobile Competence Centre, 650, Route Des Lucioles, F-06921, Sophia-Antipolis Cedex, France, vol. RAN WG4, No. Reno, US; Nov. 18, 2019-Nov. 22, 2019, Oct. 19, 2019 (Oct. 19, 2019), XP051798476,

(56) References Cited

OTHER PUBLICATIONS 480 pages, Retrieved from the Internet: URL: https://ftp.3gpp.org/tsg_ran/WG4_Radio/TSGR4_92Bis/Report/History/RAN4_92bis_RD_chairman_report_10_Fri_EOM.zip RAN4_92bis_RD_chairman_report_10_Fri_EOM.docx [retrieved on Oct. 19, 2019] -section 7.10.3.2, Issue #2 -section 8.8.2.1.2 Issue #5 -section 8.8.2.3, Issue #2—section 8.16.1.4 Issue 4.

Huawei, et al., "PDCCH-Based Power Saving Signal/channel", 3GPP TSG RAN WG1 Meeting #99, R1-1912915, Reno, USA, Nov. 18, 2019-Nov. 22, 2019, 20 Pages, Nov. 9, 2019.

Mediatek Inc: "Ramaining Details on Power Saving Signal", 3GPP TSG RAN WG1 Meeting #99, R1-1912095, Reno, USA, Nov. 18, 2019-Nov. 22, 2019, 13 Pages, Nov. 9, 2019.

* cited by examiner

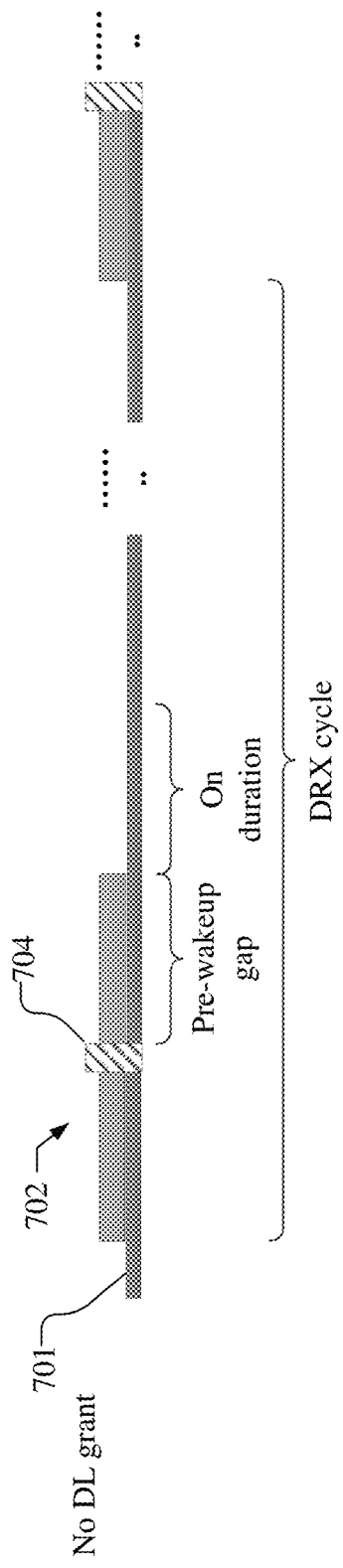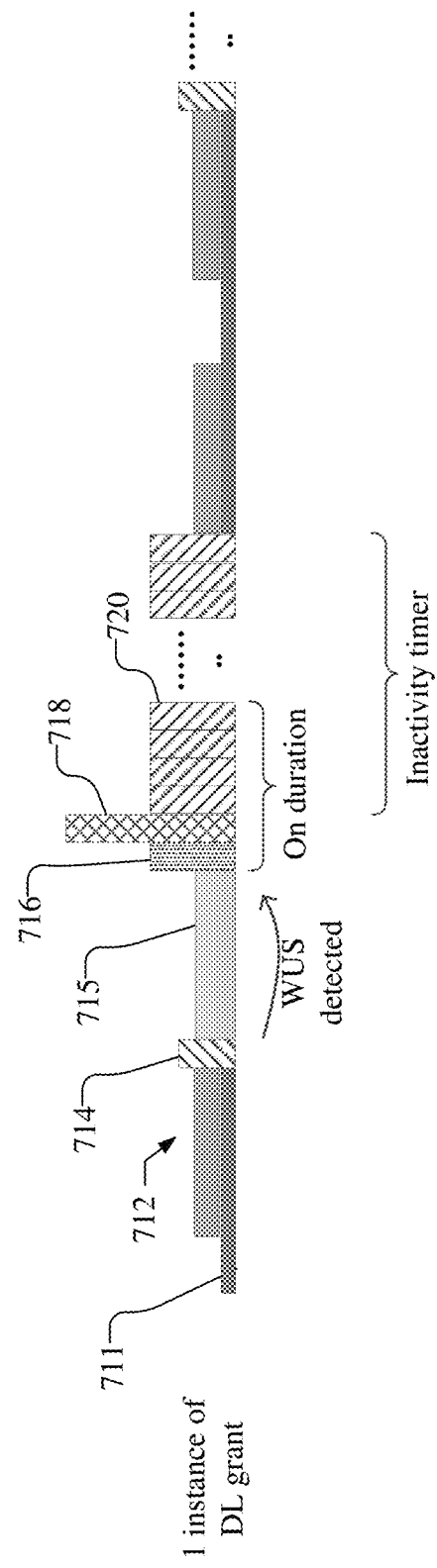
FIG. 7A
FIG. 7B

INTERACTION OF THE WAKE-UP SIGNAL (WUS) WITH DOWNLINK POSITIONING REFERENCE SIGNAL (PRS) RECEPTION IN A WIRELESS NETWORK

CROSS REFERENCE TO RELATED APPLICATIONS

This application is a National Stage Entry filed under 35 U.S.C. 371 of PCT/US2020/066008, filed on Dec. 18, 2020, entitled "INTERACTION OF THE WAKE-UP SIGNAL (WUS) WITH DOWNLINK POSITIONING REFERENCE SIGNAL (PRS) RECEPTION IN WIRELESS NETWORKS," which claims priority Greek Patent Application Number 20200100051, filed on Jan. 31, 2020, entitled "INTERACTION OF THE WAKE-UP SIGNAL (WUS) WITH DOWNLINK POSITIONING REFERENCE SIGNAL (PRS) RECEPTION IN WIRELESS NETWORKS," both of which are assigned to the assignee hereof and are expressly incorporated herein by reference in their entirety.

FIELD OF THE DISCLOSURE

Aspects of the disclosure relate generally to wireless communications and the like.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

A user equipment (UE) operating in a discontinuous reception (DRX) mode may receive a wake-up signal indicating that the UE may skip the next ON duration of the DRX cycle, i.e., the UE is instructed to not wake up during a next ON time during the DRX cycle, to monitor for communication signals, such as data signals or control signals. The UE may also be configured to receive downlink (DL) positioning reference signals (PRSs), e.g., during the next ON duration of the DRX cycle. The UE may respond to the PRS configuration and the wake-up signal, by remaining in a DRX sleep mode and not receiving the PRS or transitioning to a DRX ON mode to receive the PRS during which the UE may monitor or not monitor communication signals. The location server may receive indications of the wake-up signal configuration and status from, e.g., a serving base station or the UE. The response may depend on various factors, including the time domain behavior of the PRS, the transmission point of the PRS, whether the PRS measurement is inter-frequency or intra-frequency or whether it requires measurement gaps, whether the PRS configuration is defined for a specific option, or whether the UE 1300 is configured to respond in a specific manner based on the received wake-up signal or based on configuration from the serving base station or location server, e.g., in WUS configuration or PRS configuration message, respectively.

In one implementation, a method of wireless communication performed by a user equipment (UE) operating in a discontinuous reception (DRX) mode, includes receiving a positioning reference signal (PRS) configuration for receiving PRS; receiving a wake-up signal from a serving base station indicating that the UE is not to wake up during a next ON time during a DRX cycle to monitor for communication signals, the communication signals comprising data signals or control signals or both; in response to the PRS configuration and the wake-up signal, performing one of: A) remaining in a DRX sleep mode and not receiving the PRS; or B) transitioning to a DRX ON mode to receive the PRS but not monitoring for the communication signals; or C) transitioning to a DRX ON mode to receive the PRS and monitoring for the communication signals.

In one implementation, a user equipment (UE) configured for wireless communication and operating in a discontinuous reception (DRX) mode, includes a transceiver for wirelessly receiving and sending messages; at least one memory; and at least one processor coupled to the transceiver and the at least one memory, the at least one processor configured to: receive, via the transceiver, a positioning reference signal (PRS) configuration for receiving PRS; receive, via the transceiver, a wake-up signal from a serving base station indicating that the UE is not to wake up during a next ON time during a DRX cycle to monitor for communication signals, the communication signals comprising data signals or control signals or both; in response to the PRS configuration and the wake-up signal, perform one of: A) remain in a DRX sleep mode and not receive the PRS; or B) transition to a DRX ON mode to receive the PRS but not monitor for the communication signals; or C) transition to a DRX ON mode to receive the PRS and monitor for the communication signals.

In one implementation, a user equipment (UE) configured for wireless communication and operating in a discontinuous reception (DRX) mode, includes means for receiving a positioning reference signal (PRS) configuration for receiving PRS; means for receiving a wake-up signal from a serving base station indicating that the UE is not to wake up during a next ON time during a DRX cycle to monitor for communication signals, the communication signals comprising data signals or control signals or both; means for performing, in response to the PRS configuration and the wake-up signal, one of: remaining in a DRX sleep mode and not receiving the PRS; or transitioning to a DRX ON mode to receive the PRS but not monitoring for the communication signals; or transitioning to the DRX ON mode to receive the PRS and monitoring for the communication signals.

In one implementation, a non-transitory computer readable storage medium including program code stored thereon, the program code is operable to configure at least one processor in a user equipment (UE) configured for wireless communication and operating in a discontinuous reception (DRX) mode, includes program code to receive a positioning reference signal (PRS) configuration for receiving PRS; program code to receive a wake-up signal from a serving base station indicating that the UE is not to wake up during a next ON time during a DRX cycle to monitor for communication signals, the communication signals comprising data signals or control signals or both; program code to perform, in response to the PRS configuration and the wake-up signal, one of: remaining in a DRX sleep mode and not receiving the PRS; or transitioning to a DRX ON mode to receive the PRS but not monitoring for the communication signals; or transitioning to the DRX ON mode to receive the PRS and monitoring for the communication signals.

In one implementation, a method of wireless communication for a user equipment (UE) operating in a discontinuous reception (DRX) mode performed by a base station in a wireless network serving the UE, includes transmitting a wake-up signal to the UE indicating that the UE is not to wake up during a next ON time during a DRX cycle to monitor for communication signals, the communication signals comprising data signals or control signals or both; wherein the UE is configured to receive positioning reference signals (PRSs), and in response to the configuration to receive PRS and the wake-up signal, the UE performs one of: A) remaining in a DRX sleep mode and not receiving the PRS; or B) transitioning to a DRX ON mode to receive the PRS but not monitoring for the communication signals; or C) transitioning to a DRX ON mode to receive the PRS and monitoring for the communication signals; transmitting to a location server an indication of the wake-up signal indicating that the UE is not to wake up during the next ON time during the DRX cycle to monitor for the communication signals.

In one implementation, a base station in a wireless network serving a user equipment (UE), the UE configured for wireless communication and operating in a discontinuous reception (DRX) mode, includes a transceiver for wirelessly receiving and sending messages with UEs; a communication interface for receiving and sending messages to entities within the wireless network; at least one memory; and at least one processor coupled to the transceiver, the communication interface, and the at least one memory, the at least one processor configured to: transmit to the UE, via the transceiver, a wake-up signal indicating that the UE is not to wake up during a next ON time during a DRX cycle to monitor for communication signals, the communication signals comprising data signals or control signals or both; wherein the UE is configured to receive positioning reference signals (PRSs), and in response to the configuration to receive PRS and the wake-up signal, the UE performs one of: A) remaining in a DRX sleep mode and not receiving the PRS; or B) transitioning to a DRX ON mode to receive the PRS but not monitoring for the communication signals; or C) transitioning to a DRX ON mode to receive the PRS and monitoring for the communication signals; transmit to a location server, via the communications interface, an indication of the wake-up signal indicating that the UE is not to wake up during the next ON time during the DRX cycle to monitor for the communication signals.

In one implementation, a base station in a wireless network serving a user equipment (UE), the UE configured for wireless communication and operating in a discontinuous reception (DRX) mode performed, includes means for transmitting to the UE a wake-up signal indicating that the UE is not to wake up during a next ON time during a DRX cycle to monitor for communication signals, the communication signals comprising data signals or control signals or both; wherein the UE is configured to receive positioning reference signals (PRSs), and in response to the configuration to receive PRS and the wake-up signal, the UE performs one of: A) remaining in a DRX sleep mode and not receiving the PRS; or B) transitioning to a DRX ON mode to receive the PRS but not monitoring for the communication signals; or C) transitioning to the DRX ON mode to receive the PRS and monitoring for the communication signals; means for transmitting to a location server an indication of the wake-up signal indicating that the UE is not to wake up during the next ON time during the DRX cycle to monitor for the communication signals.

In one implementation, a non-transitory computer readable storage medium including program code stored thereon, the program code is operable to configure at least one processor in a base station in a wireless network serving a user equipment (UE), the UE configured for wireless communication and operating in a discontinuous reception (DRX) mode performed, includes program code to transmit to the UE a wake-up signal indicating that the UE is not to wake up during a next ON time during a DRX cycle to monitor for communication signals, the communication signals comprising data signals or control signals or both; wherein the UE is configured to receive positioning reference signals (PRSs), and in response to the configuration to receive PRS and the wake-up signal, the UE performs one of: A) remaining in a DRX sleep mode and not receiving the PRS; or B) transitioning to a DRX ON mode to receive the PRS but not monitoring for the communication signals; or C) transitioning to the DRX ON mode to receive the PRS and monitoring for the communication signals; program code to transmit to a location server an indication of the wake-up signal indicating that the UE is not to wake up during the next ON time during the DRX cycle to monitor for the communication signals.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 7A and 7B illustrate examples of a physical downlink control channel (PDCCH)-based wake-up signal with no downlink (DL) grant and with one instance of DL grant.

DETAILED DESCRIPTION

Figure 1:
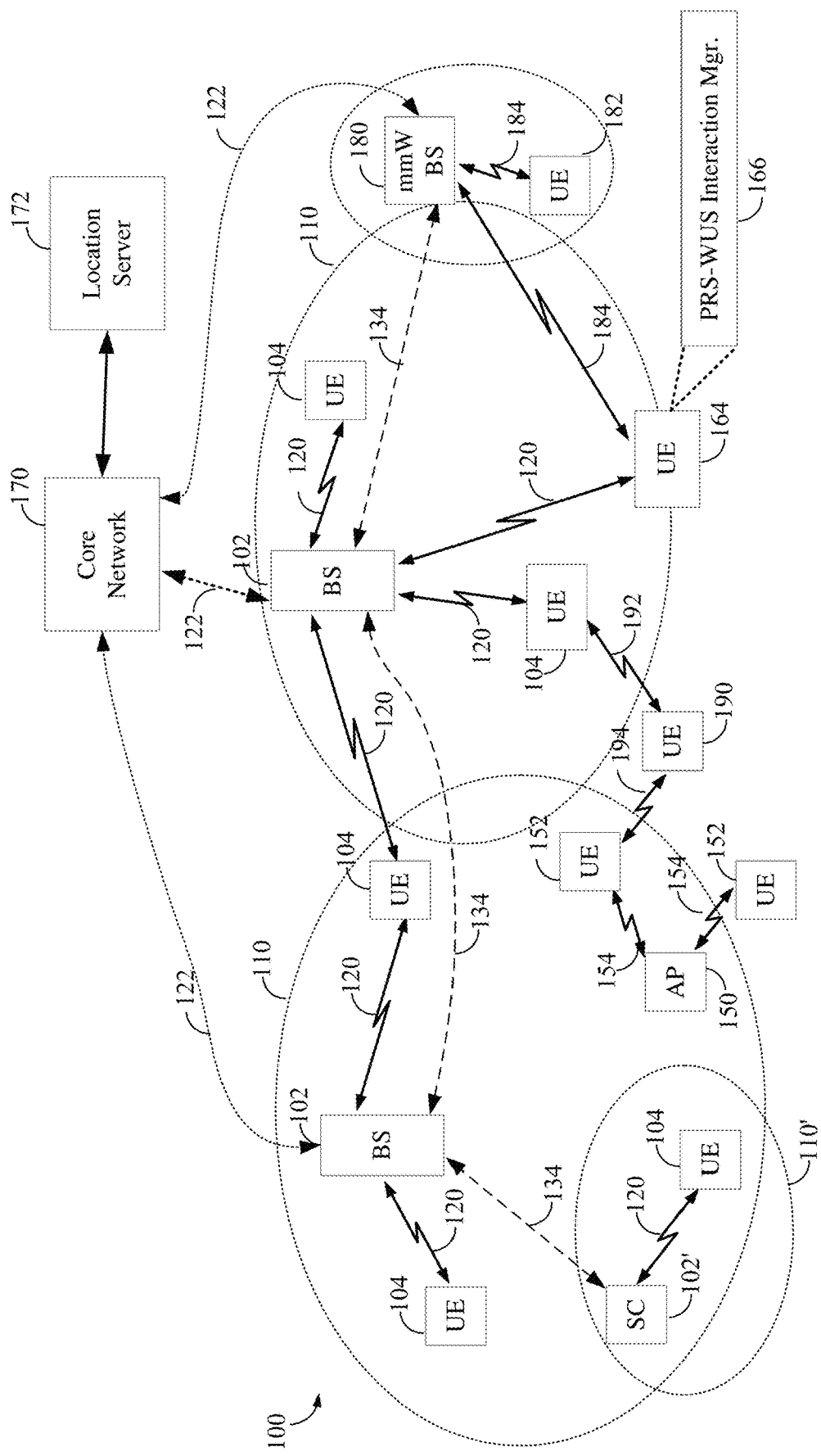
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-colocated physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a PRS-Wake-Up Signal (WUS) interaction manager 166 that may enable the UE 164 to perform the UE operations described herein. Note that although only one UE in FIG. 1 is illustrated as having a PRS-WUS interaction manager 166, any of the UEs in FIG. 1 may be configured to perform the UE operations described herein.

Figure 2A:
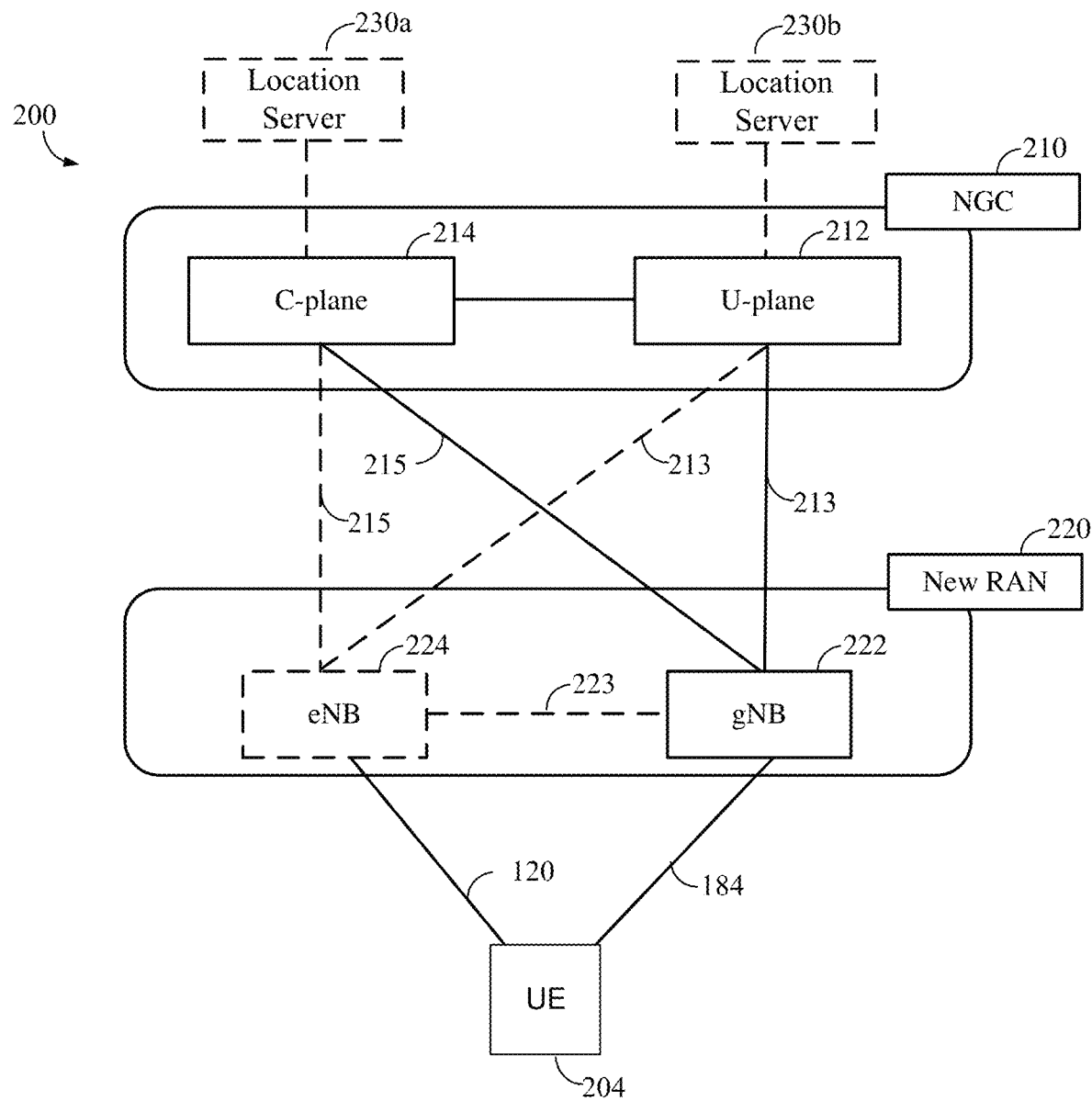
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNB s 224 and gNB s 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
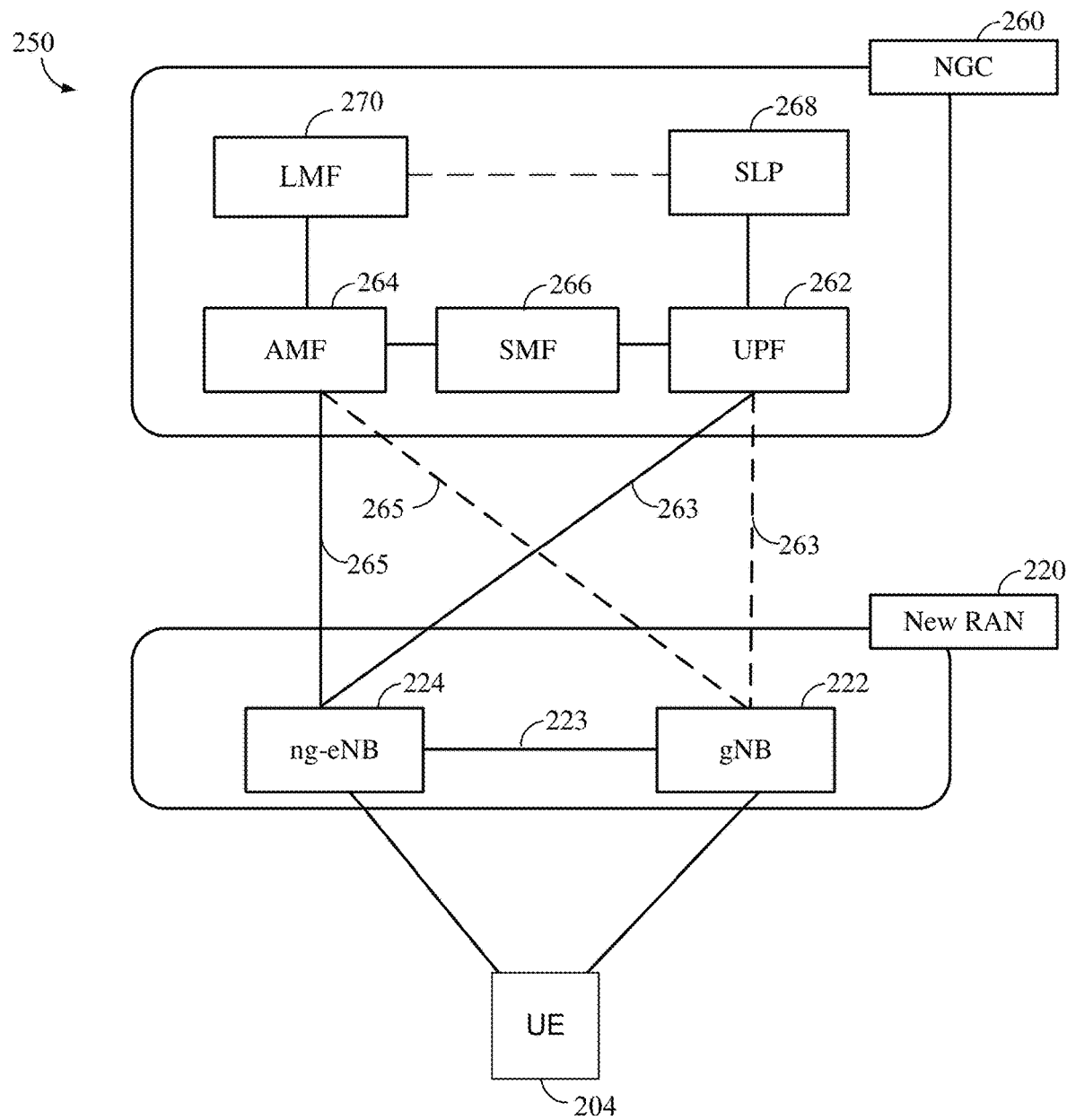

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either ng-gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
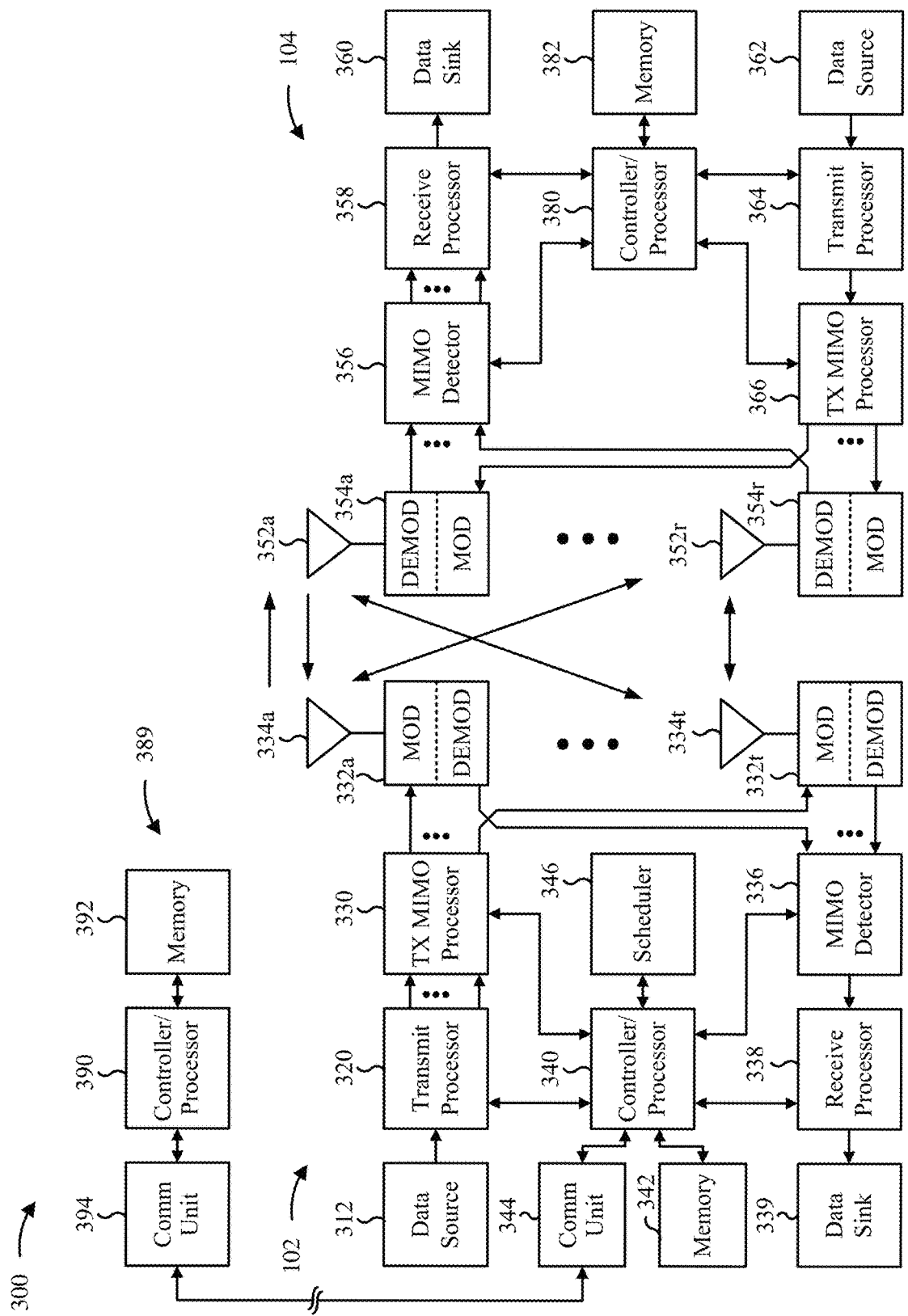
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, and/or any other component(s) of FIG. 3 may perform one or more techniques associated with interactions between wake-up signal (WUS) with downlink (DL) positioning reference signal (PRS) reception while the UE 104 is in a discontinuous reception (DRX) cycle, as described in more detail elsewhere herein. For example, controller/processor 340 of base station 102, controller/processor 380 of UE 104, and/or any other component(s) of FIG. 3 may perform or direct operations of, for example, process 1100 of FIG. 11, process 1200 of FIG. 12, and/or other processes as described herein. Memories 342 and 382 may store data and program codes for base station 102 and UE 104, respectively. In some aspects, memory 342 and/or memory 382 may comprise a non-transitory computer-readable medium storing one or more instructions for wireless communication. For example, the one or more instructions, when executed by one or more processors of the base station 102 and/or the UE 104, may perform or direct operations of, for example, process 1100 of FIG. 11, process 1200 of FIG. 12, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
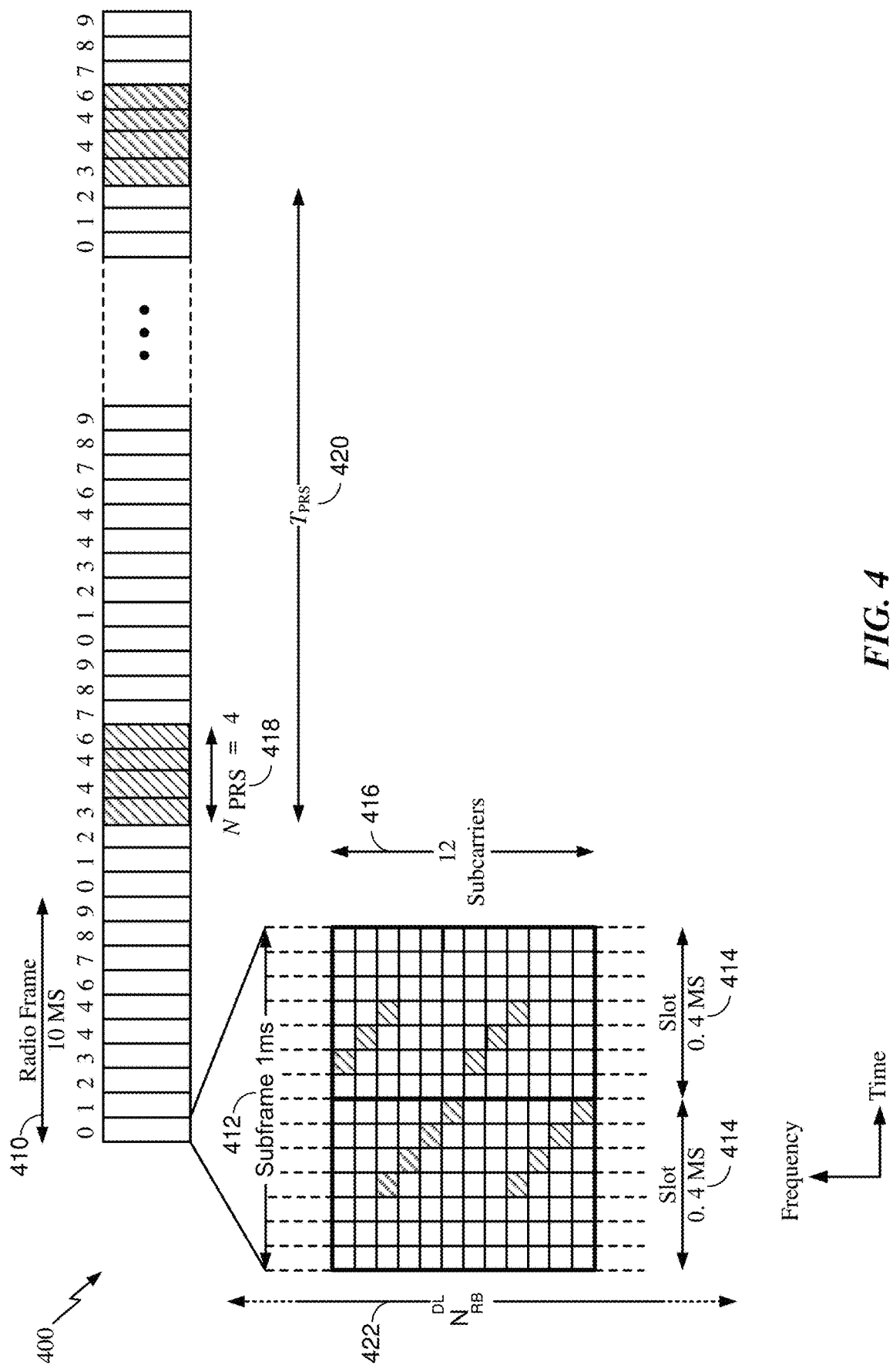
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$ if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$) In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Even when there is no traffic being transmitted from the network 170 to a UE 104, the UE 104 is expected to monitor every downlink subframe on the physical downlink control channel (PDCCH). This means that the UE 104 has to be "on," or active, all the time, even when there is no traffic, since the UE 104 does not know exactly when the network 170 will transmit data for it. However, being active all the time is a significant power drain for a UE.

To address this issue, a UE 104 may implement discontinuous reception (DRX) and/or connected-mode discontinuous reception (CDRX) techniques. DRX and CDRX are mechanisms in which a UE 104 goes into a "sleep" mode for a certain periods of time and "wakes up" for other periods of time. During the wake, or active, periods, the UE 104 checks to see if there is any data coming from the network, and if there is not, goes back into sleep mode.

To implement DRX and CDRX, the UE 104 and the network 170 need to be synchronized. In a worst case scenario, the network 170 may attempt to send some data to the UE 104 when it is in sleep mode, and the UE 104 may wake up when there is no data to be received. To prevent such scenarios, the UE 104 and the network 170 should have a well-defined agreement about when the UE 104 can be in sleep mode and when the UE 104 should be awake/active. This agreement is defined, e.g., in 3GPP Technical Specification (TS) 36.321 Section 5.7 for UEs in connected mode (CDRX), and 3GPP TS 36.304 Section 7.1 for UEs in idle mode (DRX). Both of these documents are publicly available and are incorporated by reference herein in their entirety. Note that DRX includes CDRX, and thus, references to DRX refer to both DRX and CDRX, unless otherwise indicated.

The network (e.g., serving cell 102) can configure the UE 104 with the DRX/CDRX timing using an RRC Connection Reconfiguration message (for CDRX) or an RRC Connection Setup message (for DRX). The network can signal the following DRX configuration parameters to the UE 104:

TABLE 1

| DRX Parameter | Description |
| --- | --- |
| DRX Cycle | The duration of one 'ON time' plus one 'OFF time'. (This value is not explicitly specified in RRC messages. This is calculated by the subframe time and "long DRX cycle start offset") |
| ON Duration Timer | The duration of 'ON time' within one DRX cycle |

TABLE 1-continued

| DRX Parameter | Description |
| --- | --- |
| DRX Inactivity Timer | Specifies how long a UE should remain 'ON' after the reception of a PDCCH. When this timer is on, the UE remains in the 'ON state,' which may extend the ON period into the period that would be the 'OFF' period otherwise. |
| DRX Retransmission Timer | Specifies the maximum number of consecutive PDCCH subframes the UE should remain active to wait for an incoming retransmission after the first available retransmission time |
| Short DRX Cycle | DRX cycle that can be implemented within the 'OFF' period of a long DRX Cycle |
| DRX Short Cycle Timer | The consecutive number of subframes the UE shall follow the short DRX cycle after the DRX inactivity timer has expired |

Figure 5A:
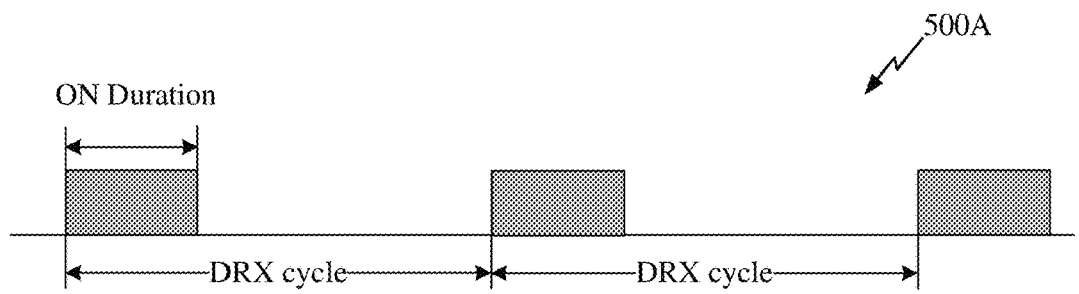
FIGS. 5A to 5C illustrate exemplary discontinuous reception (DRX) configurations, according to aspects of the disclosure.
Figure 5B:
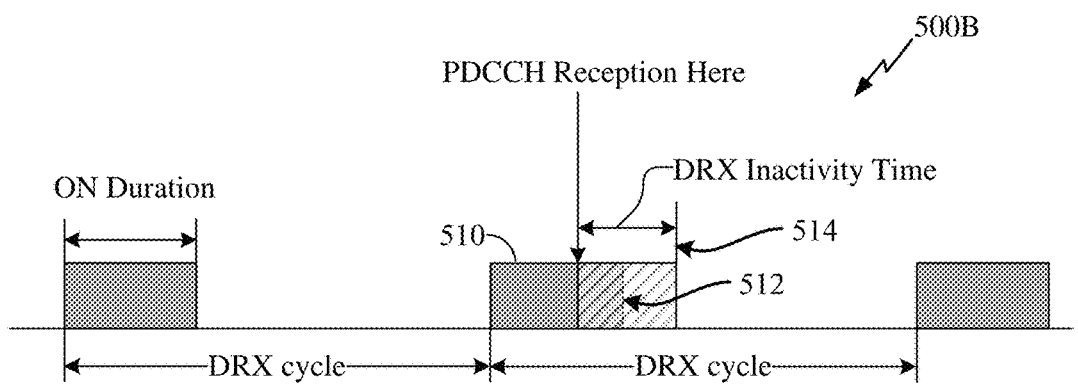
Figure 5C:
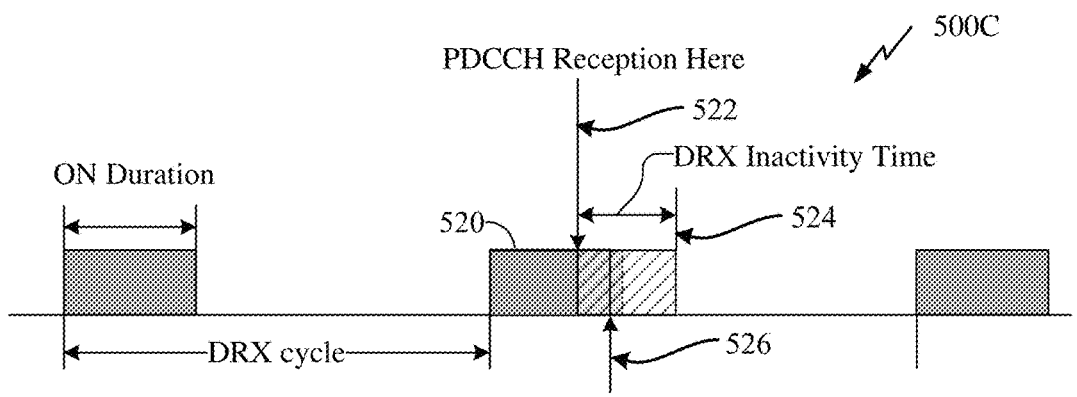

FIGS. 5A to 5C illustrate exemplary DRX configurations, according to aspects of the disclosure. FIG. 5A illustrates an exemplary DRX configuration 500A in which a long DRX cycle (the time from the start of one ON duration to the start of the next ON duration) is configured and no PDCCH is received during the cycle. FIG. 5B illustrates an exemplary DRX configuration 500B in which a long DRX cycle is configured and a PDCCH is received during an ON duration 510 of the second DRX cycle illustrated. Note that the ON duration 510 ends at time 512. However, the time that the UE is awake/active (the "active time") is extended to time 514 based on the length of the DRX inactivity timer and the time at which the PDCCH is received. Specifically, when the PDDCH is received, the UE starts the DRX inactivity timer and stays in the active state until the expiration of that timer (which is reset each time a PDDCH is received during the active time).

FIG. 5C illustrates an exemplary DRX configuration 500C in which a long DRX cycle is configured and a PDCCH and a DRX command MAC control element (CE) are received during an ON duration 520 of the second DRX cycle illustrated. Note that the active time beginning during ON duration 520 would normally end at time 524 due to the reception of the PDCCH at time 522 and the subsequent expiration of the DRX inactivity timer at time 524, as discussed above with reference to FIG. 5B. However, in the example of FIG. 5C, the active time is shortened to time 526 based on the time at which the DRX command MAC CE, which instructs the UE to terminate the DRX inactivity timer and the ON duration timer, is received.

In greater detail, the active time of a DRX cycle is the time during which the UE 104 is considered to be monitoring the PDCCH. The active time may include the time during which the ON duration timer is running, the DRC inactivity timer is running, the DRX retransmission timer is running, the MAC contention resolution timer is running, a scheduling request has been sent on the physical uplink control channel (PUCCH) and is pending, an uplink grant for a pending hybrid automatic repeat request (HARQ) retransmission can occur and there is data in the corresponding HARQ buffer, a PDCCH indicating a new transmission addressed to the cell radio network temporary identifier (C-RNTI) of the UE 104 has not been received after successful reception of a random access response (RAR) for the preamble not selected by the UE 104, and in the non-contention based random access (RA), after receiving the RAR, the UE 104 should be in an active state until the PDCCH indicating new transmission addressed to the C-RNTI of the UE 104 is received.

In some aspects, the base station 102 may configure the UE 104 to perform DRX operation, such as connected mode DRX operation (e.g., DRX operation while the UE 104 is in a connected mode with the base station 102), idle mode DRX operation (e.g., DRX operation while the UE 104 is in an idle mode), and/or the like. The DRX operation of the UE 104 may include short DRX cycle operation and long DRX cycle operation. Moreover, the UE 104 may be configured to transition between short DRX cycle operation and long DRX cycle operation.

The base station 102 may transmit to the UE 104, a WUS monitoring configuration to configure the UE 104 for WUS monitoring for short DRX cycle operation and long DRX cycle operation. In some aspects, the WUS monitoring configuration may be transmitted to the UE 104 during a random access channel (RACH) procedure between the UE 104 and the base station 102, prior to the UE 104 and the base station 102 establishing a connection, after the UE 104 and the base station 102 establish a connection, and/or the like. In some aspects, the WUS configuration may be included in a radio resource control (RRC) communication, a medium access control (MAC) control element (MAC-CE) communication, a downlink control information (DCI) communication, system information (e.g., a system information block (SIB), other system information (OSI), remaining minimum system information (RMSI), a synchronization signal block (SSB), and/or the like), and/or the like.

In some aspects, the WUS monitoring configuration may include one or more first WUS monitoring parameters for monitoring for a WUS during short DRX cycle operation of the UE 104 and may include one or more second WUS monitoring parameters for monitoring for a WUS during long DRX cycle operation of the UE 104. In some aspects, the one or more first WUS monitoring parameters may identify a WUS occasion duration for WUS occasions during short DRX cycle operation of the UE 104.

The base station 102 may transmit a WUS to the UE 104 based at least in part on the WUS monitoring configuration. For example, the base station 102 may transmit a WUS to the UE 104 based at least in part on the one or more first WUS monitoring parameters when the UE 104 is in short DRX cycle operation. As another example, the base station 102 may transmit a WUS to the UE 104 based at least in part on the one or more second WUS monitoring parameters when the UE 104 is in long DRX cycle operation.

The UE 104 may monitor for the WUS based at least in part on the WUS monitoring configuration. For example, if the UE 104 is in short DRX cycle operation, the UE 104 may monitor for the WUS based at least in part on the one or more first WUS monitoring parameters. In this case, the UE 104 may monitor for a WUS during a WUS occasion (e.g., may start monitoring for the WUS at the beginning of a WUS occasion) and at a periodicity of WUS occasions indicated by the one or more first WUS monitoring parameters, may identify a WUS indicator and wakeup information in the WUS based at least in part on the one or more first WUS monitoring parameters, may monitor for the WUS in one or more time-domain and/or frequency-domain resources based at least in part on the one or more first WUS monitoring parameters, and/or the like.

As another example, if the UE 104 is in long DRX cycle operation, the UE 104 may monitor for the UE 104 based at least in part on the one or more second WUS monitoring parameters. In this case, the UE 104 may monitor for a WUS during a WUS occasion and at a periodicity of WUS occasions indicated by the one or more second WUS monitoring parameters, may identify a WUS indicator and wakeup information in the WUS based at least in part on the one or more second WUS monitoring parameters, may monitor for the WUS in one or more time-domain and/or frequency-domain resources based at least in part on the one or more second WUS monitoring parameters, and/or the like.

Figure 6:
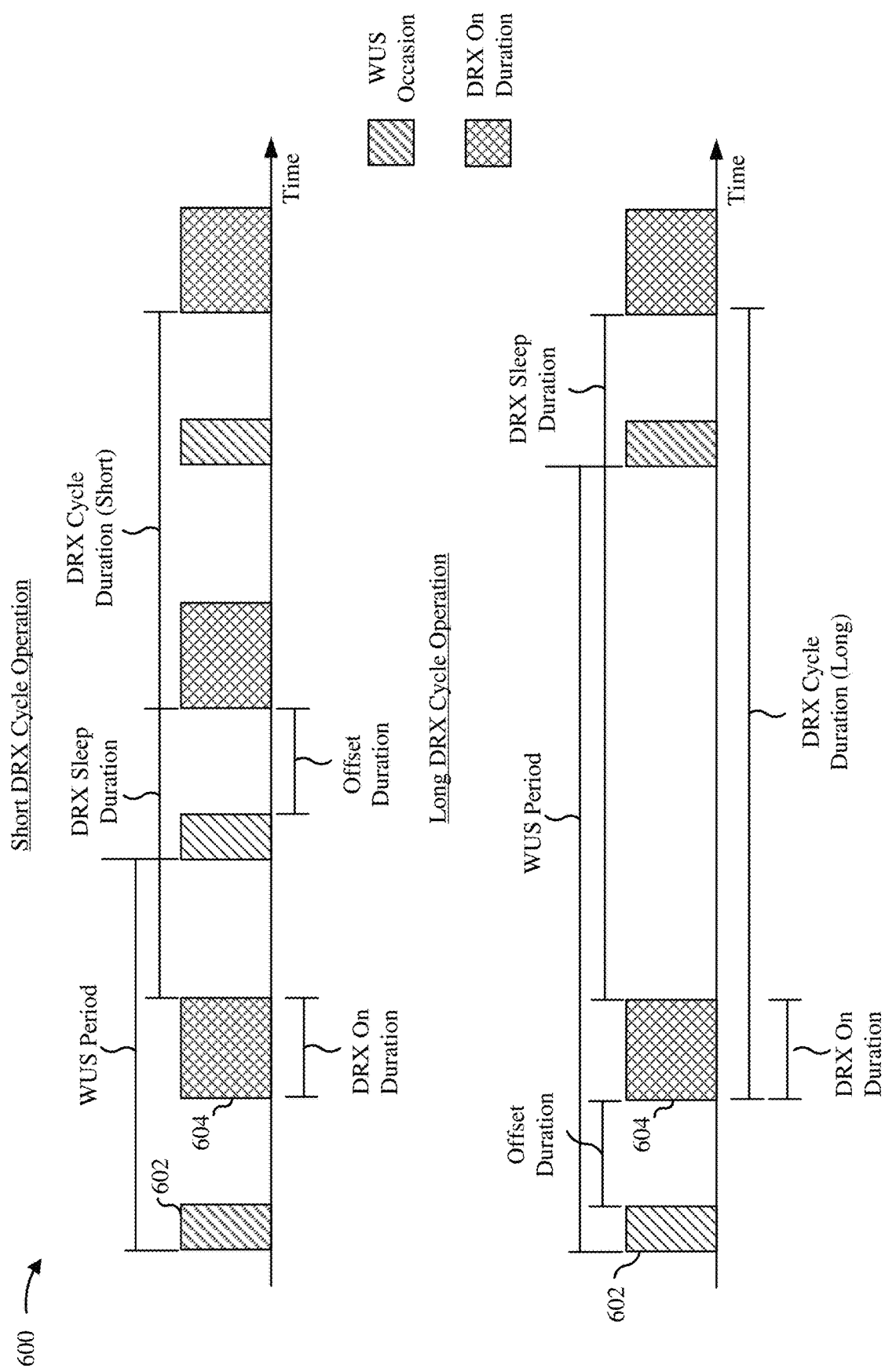
FIG. 6 illustrates examples of a wake-up signal configuration for a short DRX cycle operation and a long DRX cycle operation.

FIG. 6 illustrates examples 600 of a WUS configuration for short DRX cycle operation and a WUS configuration for long DRX cycle operation. In some aspects, the UE 104 may be configured with other WUS configurations, other short DRX cycle operation configurations, other long DRX cycle operation configurations, and/or the like.

As shown in FIG. 6, the periodicity of WUS occasions 602 for short DRX cycle operation may be shorter than the periodicity of WUS occasions for long DRX cycle operation, such that short DRX cycle operation includes a greater quantity of WUS occasions relative to long DRX cycle operation to accommodate for the greater quantity of DRX on durations 604 of short DRX cycle operation. In some aspects, other WUS monitoring parameters of short DRX cycle operation and long DRX cycle operation may be different, such as the WUS occasion duration of WUS occasions, the offset duration between WUS occasions and DRX on durations, time-domain resources and/or frequency-domain resources allocated to the WUS occasions, and/or other WUS monitoring parameters.

While the DRX cycles illustrated in FIG. 6 show a DRX on duration followed by a DRX sleep duration, the DRX cycles may alternatively include a DRX sleep duration followed by a DRX on duration.

In this way, the base station 102 may transmit a WUS monitoring configuration to the UE 104. The WUS monitoring configuration may identify one or more first WUS monitoring parameters associated with short DRX cycle operation of the UE 104 and one or more second WUS monitoring parameters associated with long DRX cycle operation of the UE 104. The UE 104 may monitor for a WUS during short DRX cycle operation based at least in part on the one or more first WUS monitoring parameters, and may monitor for a WUS during long DRX cycle operation based at least in part on the one or more second WUS monitoring parameters. In this way, the WUS monitoring configuration may configure WUS occasions for the UE 104 such that WUS occasions occur at a particular offset duration prior to an associated DRX on duration, regardless of whether the UE 104 is in short DRX cycle operation or long DRX cycle operation.

FIGS. 7A and 7B illustrate respective an example 700 of a PDCCH-based WUS, where there is no DL grant (i.e., WUS indicates UE 104 is to remain in inactive mode) and an example 750 a PDCCH-based WUS, where there is an instance of a DL grant (i.e., WUS indicates that the UE 104 is to wake-up at the next ON mode of the DRX cycle).

In FIG. 7A, for example, the UE is in DRX mode 701 and illustrates a WUS monitoring occasion 702 during which a WUS 704 is received. The WUS 704, in this instance indicates that the UE 104 is not to wake up during the ON duration of the next DRX cycle. Consequently, as illustrated, UE 104 remains inactive during the ON duration of the next DRX cycle, which occurs after a pre-wakeup gap duration.

In FIG. 7B the UE 104 is also in DRX mode 711 and illustrates a WUS monitoring occasion 712 during which a WUS 714 is received. The WUS 714 in FIG. 7B, however, indicates that the UE is to awaken at the ON duration of the next DRX cycle. Thus, after the pre-wakeup gap 715 after detecting WUS 714, the UE 104 becomes active and detects, e.g., downlink control information (DCI) 716 and PDCCH 718. The UE 104 remains on as indicated by bars 720 after reception of the PDCCH 718 for the length of the inactivity timer. In this instance, the ON period is extended into the period that the UE 104 would otherwise be OFF due to the inactivity timer. At the expiration of the inactivity timer, the UE 104 because inactive and the process continues.

The two-stage wake-up facilitates low power implementation for PDCCH-WUS detection, because during the first stage wake-up, several optimizations are possible. For example, a minimal set of hardware is required to be brought online for PDCCH-only processing. Further, the operating point in terms of the voltage levels and clock frequencies of the hardware is reduced. The PDCCH processing timeline is relaxed due to the WUS offset, i.e., pre-wakeup gap, enabling (e.g. offline processing). Moreover, the reception bandwidth, the number of candidates and/or aggregation levels for PDCCH-WUS may potentially be reduced.

A WUS may be a bit in a WUS DCI that is assigned to a particular UE 104. For example, if the bit is, e.g., a "1" it indicates that the UE 104 is to monitor the next (i.e., upcoming) ON duration, while a "0" indicates that the UE 104 is not to monitor the next ON duration and may remain in inactive or sleep mode. If the WUS indicates that the UE 104 is to wake-up, the UE 104 starts the ON Duration Timer for the next single occurrence, and otherwise the ON Duration Timer does not start.

Several power saving channel principles apply to a WUS. For example, the WUS is configured to be transmitted to a UE by a primary base station, e.g., from the primary cell (PCell) or primary secondary cell (PSCell) only. More than one WUS monitoring occasion per DRX cycle may be configured within one or multiple slots. The WUS does not impact the BWP Inactivity Timer, the data Inactivity Timer, or the sCell Deactivation Timer. The UE is not expected to monitor WUS during DRX Active Time. If the current active BWP during DRX operation does not have a WUS configuration, or the WUS monitoring occasion is invalid, the UE starts DRX ON Duration Timer for the next ON occurrence. When WUS is not detected, for example, due to discontinuous transmission (DTX) from the base station 102 or misdetection at the UE 104, the UE 104 behavior, e.g., whether to start or not to start the DRX ON Duration Timer for the next occurrence, is configurable. Further, if both Short and Long DRX cycles are configured, WUS is applied only for Long DRX cycles.

Figure 8:
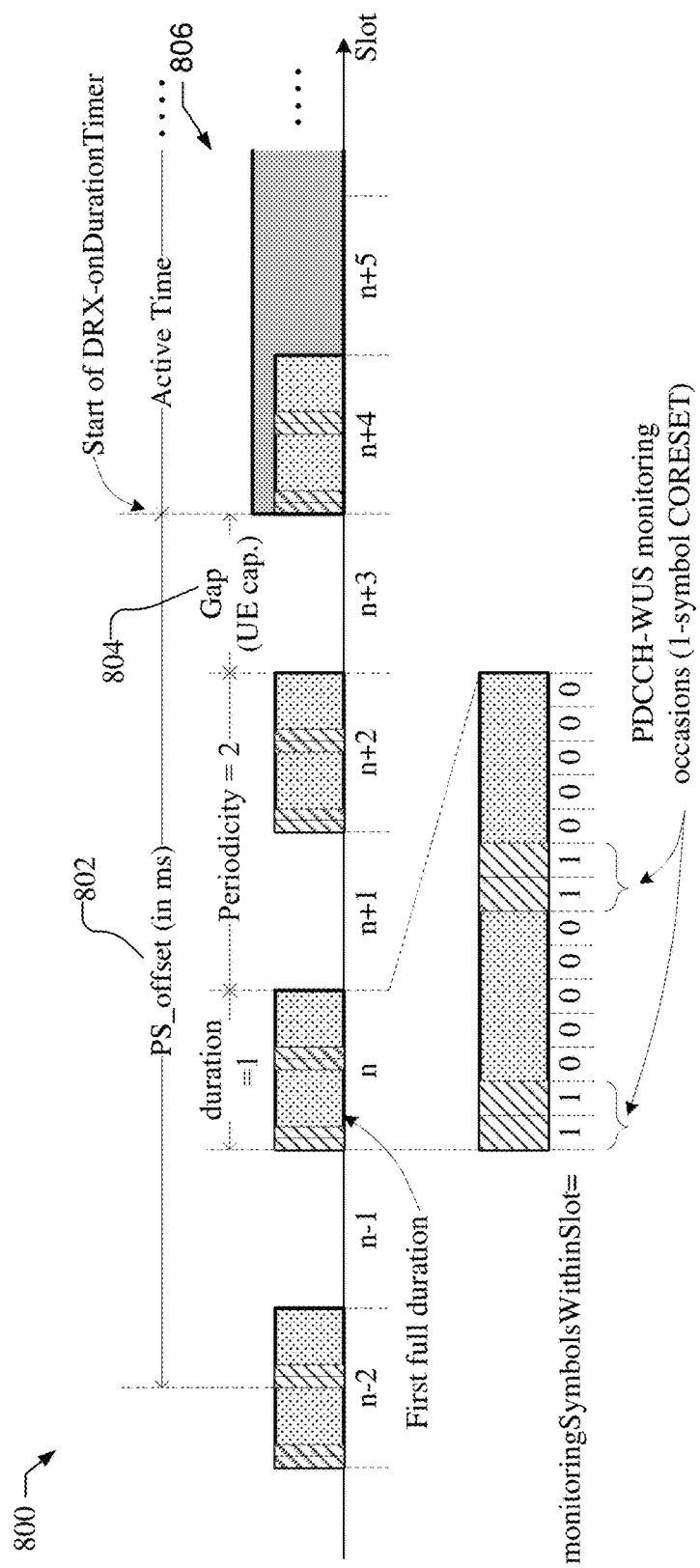
FIG. 8 illustrates an example of a wake-up signal monitoring occasion.

FIG. 8 illustrates an example of a WUS monitoring occasion 800. As illustrated, the WUS monitoring occasion 800 includes a PS_offset parameter 802 that is a per-cell-group parameter. The PS_offset parameter 802 indicates the earliest potential starting point of a WUS monitoring occasion relative to the start of a DRX cycle. The PS_offset parameter 802 has milliseconds unit and a range of values [0.125, 0.25, 0.5, 1, 2, . . . , [15]] ms.

A minimum time gap 804 is defined as the duration before the start of a DRX cycle 806, within which the UE 104 is not required to monitor WUS. The minimum time gap 804 is defined based on UE 104 capability and in unit of slots (subcarrier spacing (SCS) dependent). For a UE capability report, two candidate values per SCS are supported: the largest value is no larger than 3$ms$. The existing SearchSpace IE is used for the configuration of WUS. For example, all parameters, e.g., (duration, monitoringSymbolsWithinSlot, monitoringSlotPeriodicityAndOffset) may be used without modification. The UE 104 monitors only the first "full duration" at or after the PS_offset 802 but before the DRX ON-duration is monitored for the WUS.

Figure 9:
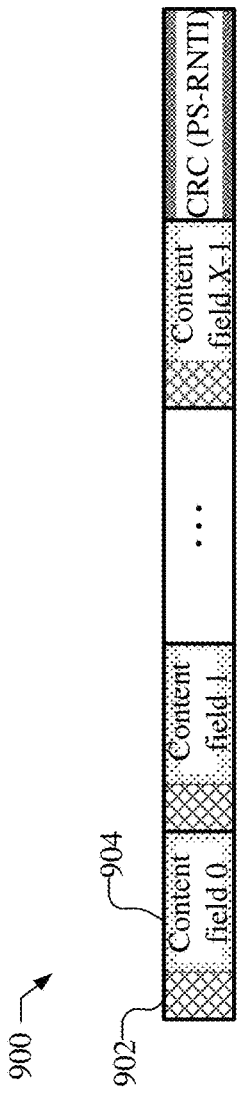
FIG. 9 illustrates an example of a format for a downlink control information (DCI) communication including a wake-up signal indicator.

FIG. 9 illustrates an example of a DCI format 900 for WUS. The DCI format and Power Saving-Radio Network Temporary Identifier (PS-RNTI) may be defined for monitoring WUS. The DCI format 900 may support multiplexing of one or more UEs and is monitored only in common search space (CSS), such as Type-3 CSS. The DCI format 900 is similar to UE-specific configuration DCI format 2_x. For example, DCI format 900 for WUS may include the same total DCI payload size in number of bits, and may include a starting bit position for the UE-specific field in the DCI. A UE-specific field 902 starts with 1-bit wake-up indicator, immediately followed by a content field 904 with X-bit (configurable) additional information. For example, a SCell dormancy behavior indication may be included in the X-bit information content field 904. Other information, such as triggering A-CSI, BWP id, etc., may also be included in the content field 904. In some implementations, the content field may include a channel state information (CSI) request and/or CSI-reference signal (RS) triggering information.

Thus, while in DRX mode, a WUS may be transmitted by a primary cell to a UE 104 to indicate whether the UE should monitor communication signals, e.g., control signals and/or data signals, during the next ON duration or to not monitor communication signals during the next ON duration in an upcoming DRX cycle. The UE 104, however, may be configured to monitor DL positioning reference signals (PRS) for positioning. If the UE 104 receives a WUS indicating that it is remain inactive during the next ON duration of the DRX cycle and to not to monitor communication signals, e.g., control signals and/or data signals, during that period, the UE 104 may not receive DL PRS that the UE 104 is expected to receive during that period. The reception of the DL PRS by the UE 104 may be important or may be unimportant in various scenarios.

In some implementations, the UE 104 may be configured to receive DL PRS while it is in DRX mode. The UE 104 may receive a WUS indicating that the UE 104 is to not to wake-up during the next ON time to monitor communications, such as control signals and data signals. In response to the PRS configuration and the receipt of the WUS, the UE 104 may: A) remain in a DRX sleep mode and not receive the PRS; B) transition to a DRX ON mode to receive the PRS, but the UE 104 does not monitor for communication signals (control signals and data signals); or C) transition to a DRX ON mode to receive the PRS and monitor for communication signals (control signals and data signals).

Whether the UE 104 states in sleep mode or transitions to a DRX ON mode, and whether, the UE 104 monitors for communication signals while it is in DRX ON mode, may depend on various factors. For example, the UE 104 response may depend on the time domain behavior of the PRS, such as whether the PRS is periodic, semi-persistent, or aperiodic. For example, if the PRS is periodic or semi-periodic, the UE 104 may remain in the DRX sleep mode and not receive the PRS (option A), as the PRS may be obtained later. However, if the PRS is aperiodic, the UE 104 may transition to the DRX ON mode to receive the PRS (and either not monitor or monitor communication signals) (options B or C).

In another implementation, the UE 104 response may depend on the transmission point of the PRS. For example, if the PRS is configured to be transmitted from a serving base station, the UE 104 may remain in the DRX sleep mode and not receive the PRS (option A). However, if the PRS is configured to be transmitted by a neighboring transmission reception point (TRP), the UE 104 may transition to the DRX ON mode to receive the PRS (and either not monitor or monitor communication signals) (options B or C). In another example, if the PRS is configured to be transmitted from a reference base station, e.g., for OTDOA measurements, the UE 104 may transition to the DRX ON mode to receive the PRS (and either not monitor or monitor communication signals) (options B or C). However, if the PRS is configured to be transmitted by a neighboring TRP, the UE 104 may remain in the DRX sleep mode and not receive the PRS (option A).

In another implementation, the UE 104 response may depend on whether the UE is performing inter-frequency or intra-frequency measurements of the PRS and/or a measurement gap configuration. For example, if the PRS is configured to be intra-frequency with an active bandwidth part and requires a measurement gap, the UE 104 may transition to the DRX ON mode to receive the PRS, but not monitor for communication signals (control signals and data signals) (option B). If, however, the PRS is configured to be inter-frequency with an active bandwidth part and does not require a measurement gap, the UE 104 may transition to a DRX ON mode to receive the PRS and monitor for communication signals (control signals and data signals) (option C).

In another implementation, the UE 104 response may depend on whether the PRS is part of a configured subset of PRS, such as a subset of PRS resources, sets, frequency layers, or transmission reception points (TRPs), or a combination thereof. For example, the PRS may be part of a configured subset of PRS for which the UE is expected to respond with a particular option, e.g., PRS resources 1, 5 and 10 are configured for option B, while other PRS resources are configured for option A.

In another implementation, the UE 104 response may depend on information included in the WUS DCI message, e.g., DCI 900. For example, information associated with the WUS in the DCI message may be a dedicated bitfield or a joint bitfield, e.g., with a channel state information (CSI) request or CSI-reference signal (RS) triggering or a combination thereof, that indicates whether the UE response should be option A, B, or C. For example, if a bitfield used for aperiodic channel state information (A-CSI) indicates that the UE 104 is not expected to monitor CSI-RS and/or report CSI parameters, the bitfield may be an indication that the UE 104 may remain in the DRX sleep mode and not receive the PRS (option A).

Additionally, the UE 104 response may be configurable by the serving base station, e.g., through an RRC message, by the location server (location server 172), e.g., through an LPP message, or by both the serving base station and the location server. For example, the location server may configure the UE 104 to transition to the DRX ON mode to receive the PRS (options B or C), while the serving base station may configure the UE 104 such that if the UE 104 is going to respond by transitioning to DRX ON mode to receive the PRS, the UE 104 will not monitor for communication signals (control signals and data signals) (option B) or the UE 104 will monitor for communication signals (control signals and data signals) (option C). Thus, the response of the UE 104 may be determined based on separate signaling from different protocols and may originate from different network entities.

In some implementations, the WUS configuration that is provided to the UE 104 by the serving base station, also may be provided to the location server by the serving base station. Additionally, the DRX configuration provided to the UE 104 by the serving base station, may also be provided to the location server by the serving base station. Thus, the serving base station may signal to the location for each UE 104 separately (e.g. by adding a time-stamp with slot/subframe/frame) when the UE 104 is configured to monitor a WUS, and when the WUS indicates whether the UE 104 is to wake up or not during a next ON time during the DRX cycle.

In some implementations, the UE may report to the location server receipt of a WUS, e.g., including timestamps, indicating that the UE 104 is to not wake up during a next ON time during the DRX cycle. The report may be included in a positioning measurement report provided to the location server, e.g., through LPP signaling.

Figure 10:
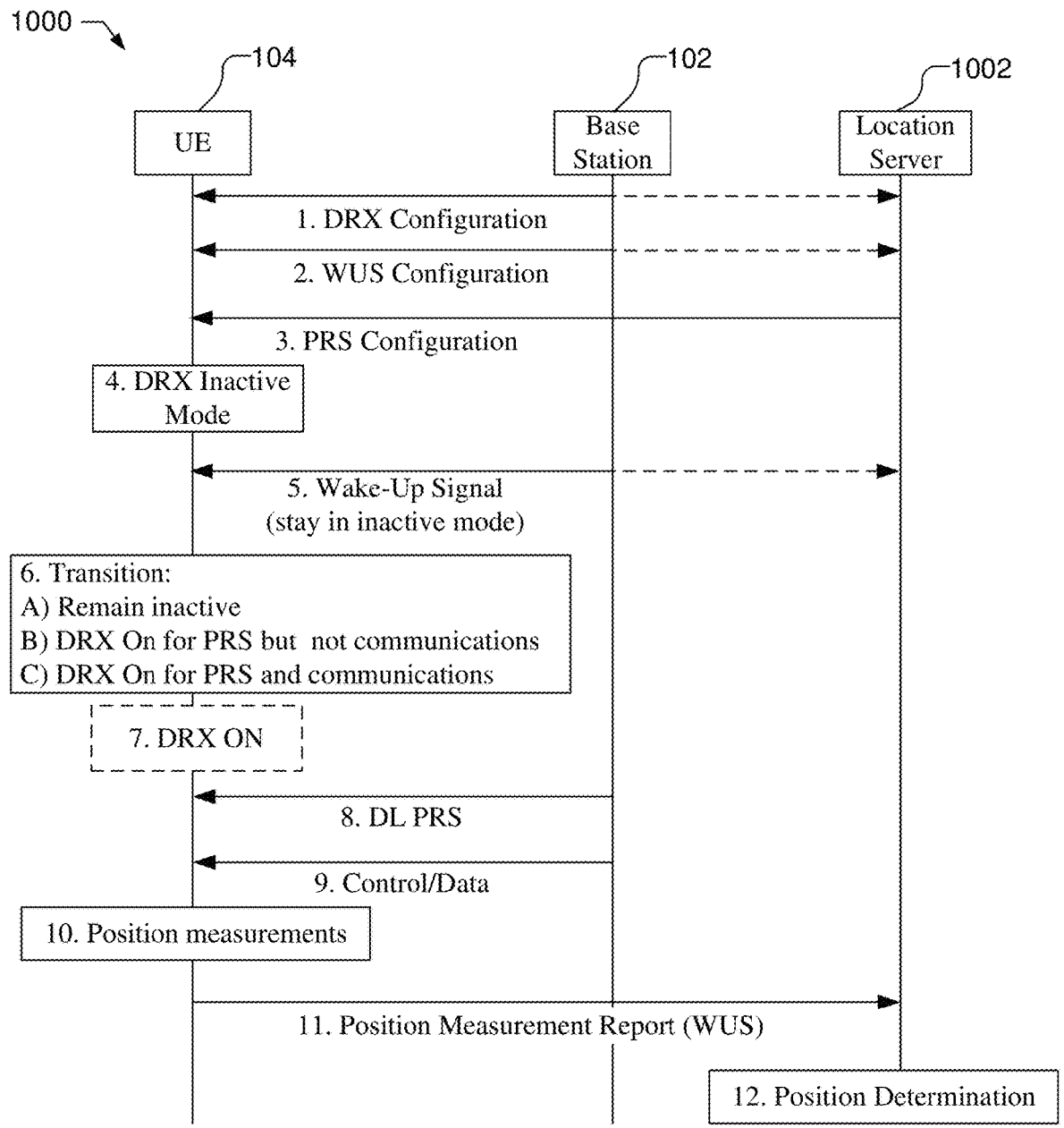
FIG. 10 is a message flow with various messages sent between components of a wireless communication system, illustrating the interaction of a wake-up signal with DL PRS reception.

FIG. 10 is a message flow 1000 with various messages sent between components of the communication system 100 depicted in FIG. 1, illustrating the interaction of a WUS with DL PRS reception. Location server 1002 may be, e.g., location server 172 shown in FIG. 1, location server 230a, 230b of FIG. 2A or LMF 270 of FIG. 2B. The UE 104 may be configured to perform UE assisted positioning or UE based positioning, in which the UE itself determines its location using, for example, assistance data provided to it. In the message flow 1000, it is assumed that the UE 104 and location server 1002 communicate using the LPP positioning protocol referred to earlier, although use of NPP or a combination of LPP and NPP or other future protocol, such as NRPPa, is also possible.

At stage 1, the UE 104 may receive a DRX configuration from the base station 102, e.g., via RRC messaging. The base station 102 may simultaneously or shortly thereafter provide the DRX configuration for the UE 104 to the location server 1002.

At stage 2, the UE 104 may receive a WUS configuration from the base station 102, e.g., via RRC messaging. The base station 102 may simultaneously or shortly thereafter provide the WUS configuration for the UE 104 to the location server 1002.

At stage 3, the UE 104 may receive a PRS configuration for one or more base stations, such as base station 102, from the location server 1002, e.g., via LPP messaging. Based on the PRS schedule, the UE 104 may determine when PRS are scheduled to be received during ON times of DRX cycles.

At stage 4, the UE 104 enters a DRX inactive mode during which the UE 104 will monitor for WUS during WUS occasions.

At stage 5, the base station 102, which may be the serving base station for the UE 104 sends and the UE 104 receives a WUS message indicating that the UE 104 is to remain in inactive mode, e.g., not to wake up during a next ON time during the DRX cycle to monitor for data signals or control signals. The base station 102 may simultaneously or shortly thereafter provide an indication of the WUS message to the location server 1002.

At stage 6, in response to the PRS configuration and the WUS, the UE 104 determines how to respond to the WUS, e.g., by A) remaining in a DRX sleep mode and not receiving the PRS; B) transitioning to a DRX ON mode to receive the PRS, but not monitoring for communication signals (e.g., data signals, or control signals, or both); or C) transitioning to a DRX ON mode to receive the PRS and to monitor for communication signals (e.g., data signals, or control signals, or both). As discussed above, how the UE 104 responds may depend on various factors, including the time domain behavior of the PRS, the transmission point of the PRS, whether the PRS measurement is inter-frequency or intra-frequency or whether it requires measurement gaps, whether the PRS configuration is defined for a specific option, or whether the UE 104 is configured to respond in a specific manner based on the WUS message in stage 5 or by the base station 102 or location server 1002.

At stage 7, depending on how the UE 104 determines how to respond to the WUS in stage 6, the UE 104 may transition to a DRX ON mode, i.e., DRX ON duration.

At stage 8, the base station 102 transmits DL PRS. Depending on how the UE 104 determined how to respond to the WUS in stage 6 and whether it transitioned to the DRX ON mode in stage 7, the UE 104 may receive the DL PRS, despite having received the WUS message in stage 5 to stay in inactive mode (e.g., in options B and C). If the UE 104 determined to remain in inactive mode (option A) and did not transition to DRX ON mode in stage 7, the UE 104 will not receive the DL PRS from base station 102.

At stage 9, the base station 102 may transmit communication signals, such as control signals or data signals. Depending on how the UE 104 determined how to respond to the WUS in stage 6 and whether it transitioned to the DRX ON mode in stage 7, the UE 104 may receive the communication signals, despite having received the WUS message in stage 5 to stay in inactive mode (e.g., in option C). If the UE 104 determined to remain in inactive mode (option A) and did not transition to DRX ON mode in stage 7, or if the transitioned to the DRX ON mode in stage 7 but is not monitoring for communication signals (option B), the UE 104 will not receive the communication signals from base station 102.

At stage 10, assuming the UE 104 transitioned to the DRX ON mode in stage 7 to receive the DL PRS in stage 8, the UE 104 may perform position measurements using the received DL PRS. For example, using the DL PRS from stage 8, and in some implementations using additional PRS from other base stations (not shown) or UL PRS transmitted by the UE 104, the UE 104 may perform positioning methods such as time of arrival (TOA), reference signal time difference (RSTD), time difference of arrival (TDOA), reference signal received power (RSRP), time difference between reception and transmission of signals (Rx-Tx), multi-Round Trip Time (M-RTT), etc. In UE based positioning methods, the UE may further determine a position estimate using the position measurements, e.g., using positions of base stations, which may be provided in an assistance data message (not shown). If the UE 104 did not transition to the DRX ON mode in stage 7, the UE 104 cannot perform position measurements on the DL PRS from stage 8, but may perform position measurements using later acquired PRS signals.

At stage 11, the UE 104 may transmit a position measurement report to the location server 1002, e.g., using LPP messaging. The position measurement report may provide the position measurements and/or position estimate, if determined, from stage 10. The UE 104 may include in the position measurement report an indication (e.g., using time stamps) of when it received any WUS message to not to wake up during a next ON time during the DRX cycle.

At stage 12, the location server 1002 may determine the UE location based on any PRS based positioning measurements received at stage 11, or may verify the UE location received at stage 11. The location server 1002 may use WUS information from the UE 104 provided at stage 11, and/or information related to the DRX configuration from stage 1, the WUS configuration at stage 2, the WUS message from stage 5 or a combination thereof, to assist in determining the UE location. For example, with knowledge of whether the UE did or did not wake up to receive PRS, the location server 1002 may perform various appropriate actions. For example, the location server 1002 may trigger or schedule additional PRS for the UE 104, increase the uncertainty of the measurements and propagate this information to the final consumer of the positioning estimation/measurements, and/or report to the serving base station that the UE 104 is required to monitor more PRS.

Figure 11:
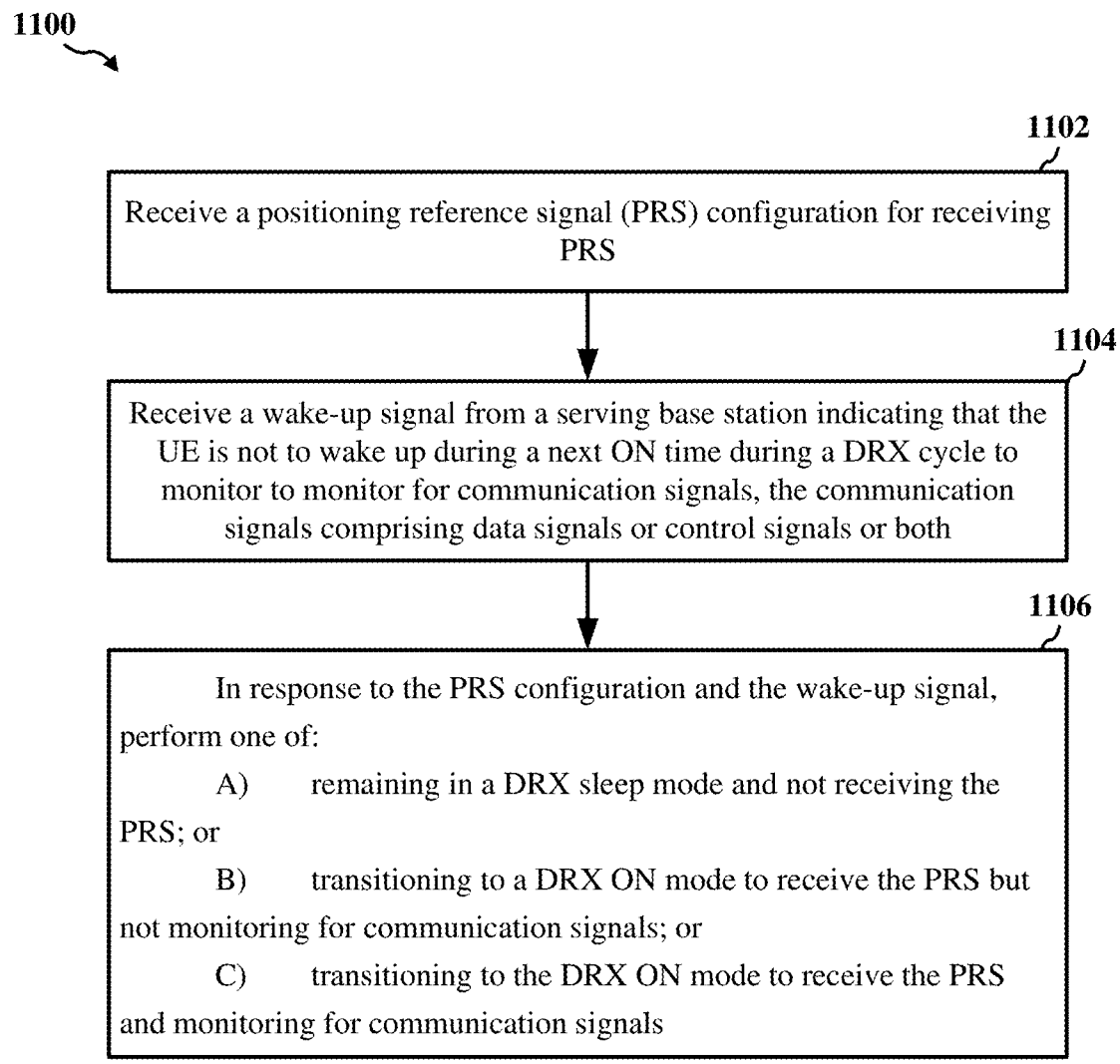
FIG. 11 shows a flowchart for an exemplary method for wireless communication performed by a UE operating in a DRX mode and the interaction of a wake-up signal with DL PRS reception.

FIG. 11 shows a flowchart for an exemplary method 1100 for wireless communication performed by a user equipment (UE), such as UE 104, operating in a discontinuous reception (DRX) mode and the interaction of a wake-up signal with DL PRS reception, in a manner consistent with disclosed implementation.

At block 1102, the UE receives a positioning reference signal (PRS) configuration for receiving PRS, e.g., as discussed at stage 3 of FIG. 10. At block 1104, a wake-up signal is received from a serving base station indicating that the UE is not to wake up during a next ON time during a DRX cycle to monitor for communication signals, the communication signals comprising data signals or control signals or both, e.g., as discussed at stage 5 of FIG. 10. At block 1106, in response to the PRS configuration and the wake-up signal, the UE performs one of: A) remaining in a DRX sleep mode and not receiving the PRS; or B) transitioning to a DRX ON mode to receive the PRS but not monitoring for communication signals, or both; or C) transitioning to the DRX ON mode to receive the PRS and monitoring for communication signals, e.g., as discussed at stages 6, 7, 8, and 9 of FIG. 10.

In one implementation, the PRS may be scheduled to be received during the next ON time during the DRX cycle, e.g., as discussed at stage 3 of FIG. 10.

In one implementation, the performance of A) remaining in the DRX sleep mode and not receiving the PRS, B) transitioning to the DRX ON mode to receive the PRS but not monitoring for communication signals, or C) transitioning to the DRX ON mode to receive the PRS and monitoring for communication signals is dependent on time domain behavior of the PRS, wherein time-domain behavior comprises the PRS being periodic, semi-persistent, or aperiodic. For example, the UE may perform A) remaining in the DRX sleep mode and not receiving the PRS when the PRS is configured to be periodic or semi-periodic, and the UE may perform B) transitioning to the DRX ON mode to receive the PRS but not monitoring for communication signals or C) transitioning to the DRX ON mode to receive the PRS and monitoring for communication signals when the PRS is configured to be aperiodic.

In one implementation, the performance of A) remaining in the DRX sleep mode and not receiving the PRS, B) transitioning to the DRX ON mode to receive the PRS but not monitoring for communication signals, or C) transitioning to the DRX ON mode to receive the PRS and monitoring for communication signals is dependent on a transmission point of the PRS. For example, the UE may perform A) remaining in the DRX sleep mode and not receiving the PRS when the PRS is configured to be transmitted by the serving base station, and the UE may perform B) transitioning to the DRX ON mode to receive the PRS but not monitoring for communication signals or C) transitioning to the DRX ON mode to receive the PRS and monitoring for communication signals when the PRS is configured to be transmitted by a neighboring TRP. In another example, the UE may perform B) transitioning to the DRX ON mode to receive the PRS but not monitoring for communication signals or C) transitioning to the DRX ON mode to receive the PRS and monitoring for communication signals when the PRS is configured to be transmitted by a reference base station, and the UE may perform A) remaining in the DRX sleep mode and not receiving the PRS when the PRS is configured to be transmitted by a neighboring TRP.

In one implementation, the performance of A) remaining in the DRX sleep mode and not receiving the PRS, B) transitioning to the DRX ON mode to receive the PRS but not monitoring for communication signals, or C) transitioning to the DRX ON mode to receive the PRS and monitoring for communication signals is dependent on one or more of the UE performing inter-frequency or intra-frequency measurement of the PRS or a measurement gap configuration. For example, the UE may perform B) transitioning to the DRX ON mode to receive the PRS but not monitoring for communication signals when the PRS is configured to be intra-frequency with an active bandwidth part and requires a measurement gap or the UE may perform C) transitioning to the DRX ON mode to receive the PRS and monitoring for communication signals when the PRS is configured to be inter-frequency with the active bandwidth part and does not require the measurement gap.

In one implementation, the PRS is part of a subset of PRS for which the UE is configured to perform A) remaining in the DRX sleep mode and not receiving the PRS, B) transitioning to the DRX ON mode to receive the PRS but not monitoring for communication signals, or C) transitioning to the DRX ON mode to receive the PRS and monitoring for communication signals. For example, the subset of PRS may comprise a subset of PRS resources, PRS sets, PRS frequency layers, or PRS transmitted by transmission reception points (TRPs), or combination thereof.

In one implementation, the wake-up signal is an indicator in a downlink control information (DCI) message, wherein the UE may perform A) remaining in the DRX sleep mode and not receiving the PRS, B) transitioning to the DRX ON mode to receive the PRS but not monitoring for communication signals, or C) transitioning to the DRX ON mode to receive the PRS and monitoring for communication signals based on information associated with the wake-up signal in the DCI message. For example, the information associated with the wake-up signal in the DCI message may be a joint bitfield with a channel state information (CSI) request or CSI-reference signal (RS) triggering or a combination thereof, or may be a dedicated bitfield for indicating whether the UE may perform A) remaining in the DRX sleep mode and not receiving the PRS, B) transitioning to the DRX ON mode to receive the PRS but not monitoring for communication signals, or C) transitioning to the DRX ON mode to receive the PRS and monitoring for communication signals.

In one implementation, the UE may further receive one or more of a message from the serving base station, a message from a location server, or a combination thereof, that configures the UE to perform A) remaining in the DRX sleep mode and not receiving the PRS, B) transitioning to the DRX ON mode to receive the PRS but not monitoring for communication signals, or C) transitioning to the DRX ON mode to receive the PRS and monitoring for communication signals. For example, the message from the location server may configure the UE to transition to the DRX ON mode to receive the PRS in response to a wake-up signal indicating that the UE is not to wake up, and the message from the serving base station may configure the UE to not monitor for communication signals or to monitor for communication signals.

In one implementation, the wake-up signal indicating that the UE is not to wake up during the next ON time during the DRX cycle to monitor for data signals or control signals may be provided to a location server from the serving base station. The UE may further receive a DRX configuration from the serving base station, wherein the DRX configuration is provided to a location server from the serving base station, e.g., as discussed at stage 1 of FIG. 10. For example, the serving base station may provide to the location server when the UE is configured to monitor a wake-up signal and when the wake-up signal is ON or OFF, e.g., as discussed at stages 2 and 5 of FIG. 10.

In one implementation, the UE may transmit a report to a location server of the receipt of the wake-up signal indicating that the UE is not to wake up during the next ON time during the DRX cycle, e.g., as discussed at stage 11 of FIG. 10. For example, the report of the receipt of the wake-up signal may be in a positioning measurement report, e.g., as discussed at stage 11 of FIG. 10.

Figure 12:
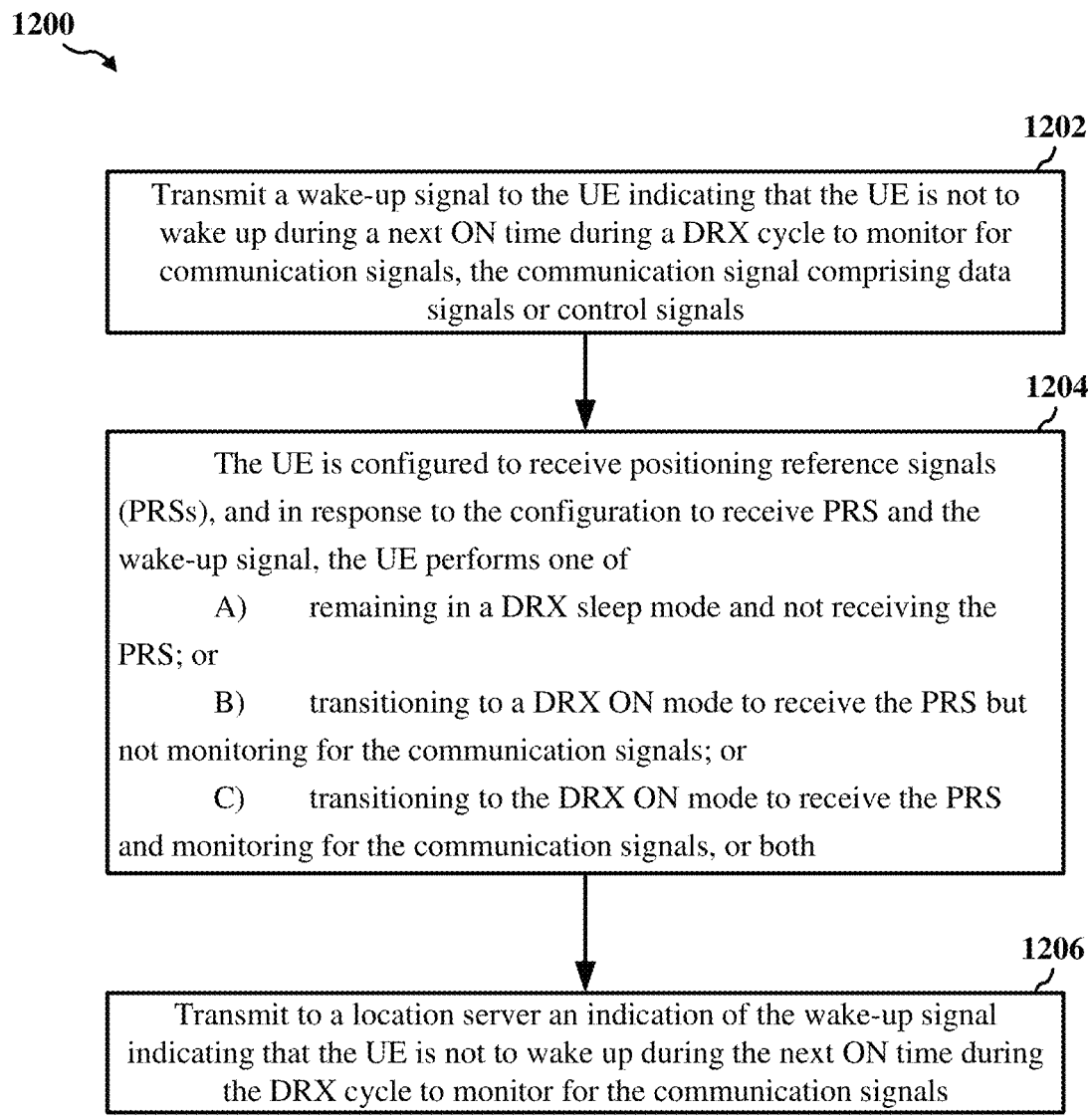
FIG. 12 shows a flowchart for an exemplary method performed by a base station for wireless communication with a UE operating in a DRX mode and the interaction of a wake-up signal with DL PRS reception.

FIG. 12 shows a flowchart for an exemplary method 1200 performed by a base station, such as base station 102, for wireless communication for a user equipment (UE), such as UE 104, operating in a discontinuous reception (DRX) mode and the interaction of a wake-up signal with DL PRS reception, in a manner consistent with disclosed implementation.

At block 1202, the base station transmit a wake-up signal to the UE indicating that the UE is not to wake up during a next ON time during a DRX cycle to monitor for communication signals, the communication signal comprising data signals or control signals, e.g., as discussed at stage 5 of FIG. 10. At block 1204, the UE is configured to receive positioning reference signals (PRSs), and in response to the configuration to receive PRS and the wake-up signal, the UE performs one of: A) remaining in a DRX sleep mode and not receiving the PRS; or B) transitioning to a DRX ON mode to receive the PRS but not monitoring for communication signals; or C) transitioning to the DRX ON mode to receive the PRS and monitoring for communication signals, e.g., as discussed at stages 6, 7, 8, and 9 of FIG. 10. At block 1206, the base station transmits to a location server an indication of the wake-up signal indicating that the UE is not to wake up during the next ON time during the DRX cycle to monitor for the communication signals, e.g., as discussed at stage 5 of FIG. 10.

In one implementation, the base station may further transmit a DRX configuration to the UE, e.g., as discussed at stage 1 of FIG. 10. The base station may transmit the DRX configuration to the location server, e.g., as discussed at stage 1 of FIG. 10.

In one implementation, the base station further transmits to the location server an indication of when the UE is configured to monitor the wake-up signal and when the wake-up signal is ON or OFF, e.g., as discussed at stages 2 and 5 of FIG. 10.

Figure 13:
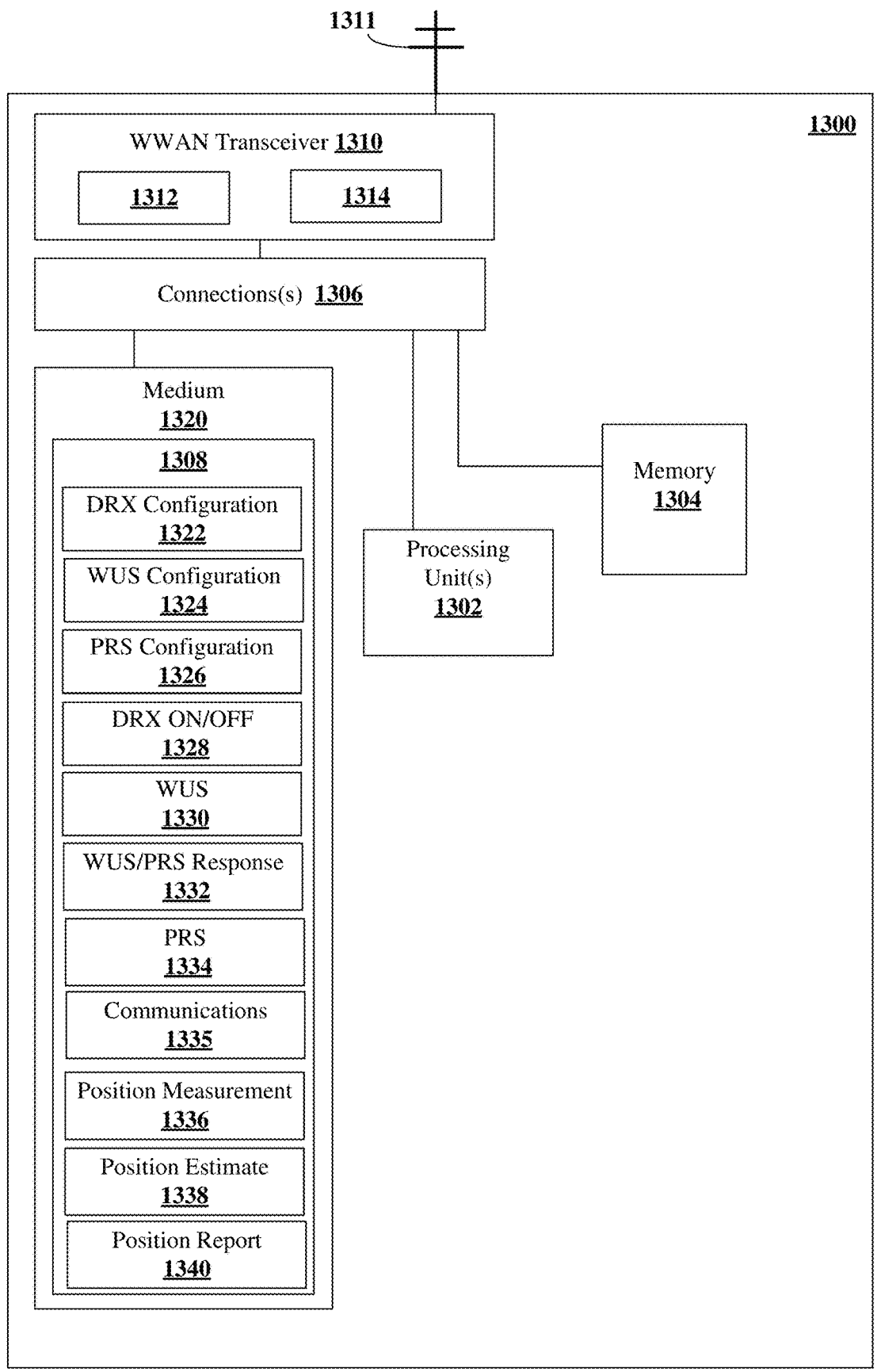
FIG. 13 shows a schematic block diagram illustrating certain exemplary features of a UE enabled to support positioning while operating in a DRX mode and receiving DL PRS after receiving a wake-up signal.

FIG. 13 shows a schematic block diagram illustrating certain exemplary features of a UE 1300, e.g., which may be UE 104 shown in FIG. 1, enabled to support positioning while operating in DRX mode and receiving DL PRS after receiving a WUS, as described herein. UE 1300 may, for example, include one or more processors 1302, memory 1304, an external interface such as a transceiver 1310 (e.g., wireless network interface), which may be operatively coupled with one or more connections 1306 (e.g., buses, lines, fibers, links, etc.) to non-transitory computer readable medium 1320 and memory 1304. The UE 1300 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1300 may take the form of a chipset, and/or the like. Transceiver 1310 may, for example, include a transmitter 1312 enabled to transmit one or more signals over one or more types of wireless communication networks and a receiver 1314 to receive one or more signals transmitted over the one or more types of wireless communication networks.

In some embodiments, UE 1300 may include antenna 1311, which may be internal or external. UE antenna 1311 may be used to transmit and/or receive signals processed by transceiver 1310. In some embodiments, UE antenna 1311 may be coupled to transceiver 1310. In some embodiments, measurements of signals received (transmitted) by UE 1300 may be performed at the point of connection of the UE antenna 1311 and transceiver 1310. For example, the measurement point of reference for received (transmitted) RF signal measurements may be an input (output) terminal of the receiver 1314 (transmitter 1312) and an output (input) terminal of the UE antenna 1311. In a UE 1300 with multiple UE antennas 1311 or antenna arrays, the antenna connector may be viewed as a virtual point representing the aggregate output (input) of multiple UE antennas. In some embodiments, UE 1300 may measure received signals including signal strength and TOA measurements and the raw measurements may be processed by the one or more processors 1302.

The one or more processors 1302 may be implemented using a combination of hardware, firmware, and software. For example, the one or more processors 1302 may be configured to perform the functions discussed herein by implementing one or more instructions or program code 1308 on a non-transitory computer readable medium, such as medium 1320 and/or memory 1304. In some embodiments, the one or more processors 1302 may represent one or more circuits configurable to perform at least a portion of a data signal computing procedure or process related to the operation of UE 1300.

The medium 1320 and/or memory 1304 may store instructions or program code 1308 that contain executable code or software instructions that when executed by the one or more processors 1302 cause the one or more processors 1302 to operate as a special purpose computer programmed to perform the techniques disclosed herein. As illustrated in UE 1300, the medium 1320 and/or memory 1304 may include one or more components or modules that may be implemented by the one or more processors 1302 to perform the methodologies described herein. While the components or modules are illustrated as software in medium 1320 that is executable by the one or more processors 1302, it should be understood that the components or modules may be stored in memory 1304 or may be dedicated hardware either in the one or more processors 1302 or off the processors.

A number of software modules and data tables may reside in the medium 1320 and/or memory 1304 and be utilized by the one or more processors 1302 in order to manage both communications and the functionality described herein. It should be appreciated that the organization of the contents of the medium 1320 and/or memory 1304 as shown in UE 1300 is merely exemplary, and as such the functionality of the modules and/or data structures may be combined, separated, and/or be structured in different ways depending upon the implementation of the UE 1300.

The medium 1320 and/or memory 1304 may include DRX configuration module 1322 that when implemented by the one or more processors 1302 configures the one or more processors 1302 to receive a DRX configuration message via transceiver 1310, e.g., from a serving base station via an RRC message.

The medium 1320 and/or memory 1304 may include a WUS configuration module 1324 that when implemented by the one or more processors 1302 configures the one or more processors 1302 to receive a WUS configuration message via transceiver 1310, e.g., from a serving base station via an RRC message. For example, the WUS configuration module 1324 may configure the one or more processors 1302 to receive a message from a serving base station indicating how to respond to a wake-up signal indicating to remain inactive during the next DRX ON duration if a DL PRS is configured to be received during that period.

The medium 1320 and/or memory 1304 may include a PRS configuration module 1326 that when implemented by the one or more processors 1302 configures the one or more processors 1302 to receive the PRS configuration for DL PRS transmissions from one or more base station via transceiver 1310, from a location server via an LPP message. For example, the PRS configuration module 1326 may configure the one or more processors 1302 to receive a message from a location server indicating how to respond to a wake-up signal indicating to remain inactive during the next DRX ON duration if a DL PRS is configured to be received during that period.

The medium 1320 and/or memory 1304 may include a DRX ON/OFF module 1328 that when implemented by the one or more processors 1302 configures the one or more processors 1302 to transition between an ON mode or an OFF mode during a DRX cycle pursuant to the DRX configuration, as discussed herein.

The medium 1320 and/or memory 1304 may include a WUS module 1330 that when implemented by the one or more processors 1302 configures the one or more processors 1302 to receive a wake-up signal from a serving base station via the transceiver 1310. The wake-up signal indicating whether the UE is to wake up or not during a next ON time during the DRX cycle to monitor for communication signals, such as data signals or control signals.

The medium 1320 and/or memory 1304 may include a WUS/PRS response module 1332 that when implemented by the one or more processors 1302 configures the one or more processors 1302 how to respond to a received wake-up signal in light of the PRS configuration. For example, where a wake-up signal is received indicating that the UE 1300 is not to wake up during a next ON time during a DRX cycle to monitor communication signals, and that a PRS is configured to be transmitted during the next ON time, the WUS/PRS response module 1332 may configure the one or more processors to A) remain in a DRX sleep mode and not receive the PRS; B) transition to a DRX ON mode to receive the PRS, but not monitor for communication signals, e.g., data signals, or control signals, or both; or C) transition to a DRX ON mode to receive the PRS and monitor for communication signals, e.g., data signals, or control signals, or both. As discussed herein, the response may depend on various factors, including the time domain behavior of the PRS, the transmission point of the PRS, whether the PRS measurement is inter-frequency or intra-frequency or whether it requires measurement gaps, whether the PRS configuration is defined for a specific option, or whether the UE 1300 is configured to respond in a specific manner based on the received wake-up signal or based on configuration from the serving base station or location server, e.g., in WUS configuration or PRS configuration message, respectively.

The medium 1320 and/or memory 1304 may include a PRS module 1334 that when implemented by the one or more processors 1302 configures the one or more processors 1302 to receive DL PRS from one or more base stations.

The medium 1320 and/or memory 1304 may include a communications module 1335 that when implemented by the one or more processors 1302 configures the one or more processors 1302 to receive communication signals from one or more base stations.

The medium 1320 and/or memory 1304 may include a position measurement module 1336 that when implemented by the one or more processors 1302 configures the one or more processors 1302 to perform positioning measurements using received DL PRS from one or more base stations. For example, the positioning measurements may be, e.g., TOA, RSTD, OTDOA, Rx-Tx, RSRP, or RTT if uplink reference signals are used.

The medium 1320 and/or memory 1304 may include a position estimate module 1338 that when implemented by the one or more processors 1302 configures the one or more processors 1302 to estimate a position of the UE 1300 in a UE based positioning process using the position measurements and the locations of base stations, e.g., received in assistance data.

The medium 1320 and/or memory 1304 may include a position report module 1340 that when implemented by the one or more processors 1302 configures the one or more processors 1302 to transmit position measurement report based on the positioning measurements and/or position estimate via the transceiver 1310, e.g., to a location server via an LPP message. Along with a position information, the position measurement report may include information regarding received wake-up signals, including timing and whether the UE was instructed to wake up or not during the next ON time during the DRX cycle.

The methodologies described herein may be implemented by various means depending upon the application. For example, these methodologies may be implemented in hardware, firmware, software, or any combination thereof. For a hardware implementation, the one or more processors 1302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1320 or memory 1304 that is connected to and executed by the one or more processors 1302. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1308 on a non-transitory computer readable medium, such as medium 1320 and/or memory 1304. Examples include computer readable media encoded with a data structure and computer readable media encoded with a computer program 1308. For example, the non-transitory computer readable medium including program code 1308 stored thereon may include program code 1308 to support OTDOA measurements in a manner consistent with disclosed embodiments. Non-transitory computer readable medium 1320 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1308 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1320, instructions and/or data may be provided as signals on transmission media included in a communication apparatus. For example, a communication apparatus may include a transceiver 1310 having signals indicative of instructions and data. The instructions and data are configured to cause one or more processors to implement the functions outlined in the claims. That is, the communication apparatus includes transmission media with signals indicative of information to perform disclosed functions.

Memory 1304 may represent any data storage mechanism. Memory 1304 may include, for example, a primary memory and/or a secondary memory. Primary memory may include, for example, a random access memory, read only memory, etc. While illustrated in this example as being separate from one or more processors 1302, it should be understood that all or part of a primary memory may be provided within or otherwise co-located/coupled with the one or more processors 1302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1320. As such, in certain example implementations, the methods and/or apparatuses presented herein may take the form in whole or part of a computer readable medium 1320 that may include computer implementable code 1308 stored thereon, which if executed by one or more processors 1302 may be operatively enabled to perform all or portions of the example operations as described herein. Computer readable medium 1320 may be a part of memory 1304.

A user equipment (UE) configured for wireless communication and operating in a discontinuous reception (DRX) mode, may include a means for receiving a positioning reference signal (PRS) configuration for receiving PRS, which may be, e.g., the wireless transceiver 1310 and one or more processors 1302 with dedicated hardware or implementing executable code or software instructions in memory 1320 such as the PRS configuration module 1326. A means for receiving a wake-up signal from a serving base station indicating that the UE is not to wake up during a next ON time during a DRX cycle to monitor for communication signals, the communication signals comprising data signals or control signals or both may be, e.g., the wireless transceiver 1310 and one or more processors 1302 with dedicated hardware or implementing executable code or software instructions in memory 1320 such as the WUS module 1330. The UE includes a means for performing, in response to the PRS configuration and the wake-up signal, one of: A) remaining in a DRX sleep mode and not receiving the PRS; or B) transitioning to a DRX ON mode to receive the PRS but not monitoring for the communication signals; or C) transitioning to the DRX ON mode to receive the PRS and monitoring for the communication signals, which may be, e.g., the wireless transceiver 1310 and one or more processors 1302 with dedicated hardware or implementing executable code or software instructions in memory 1320 such as the WUS/PRS Response module 1332, the PRS module 1334, and the communications module 1335.

In one implementation, the UE may include a means for receiving one or more of a message from the serving base station, a message from a location server, or a combination thereof, that configures the UE to perform A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals, which may be, e.g., the wireless transceiver 1310 and one or more processors 1302 with dedicated hardware or implementing executable code or software instructions in memory 1320 such as the WUS configuration module 1324, the PRS configuration module 1326, the WUS/PRS Response module 1332, the PRS module 1334, and the communications module 1335.

In one implementation, the UE may include a means for receiving a DRX configuration from the serving base station, wherein the DRX configuration is provided to the location server from the serving base station, which may be, e.g., the wireless transceiver 1310 and one or more processors 1302 with dedicated hardware or implementing executable code or software instructions in memory 1320 such as the DRX configuration module 1322.

In one implementation, the UE may include a means for transmitting a report to a location server of the receipt of the wake-up signal indicating that the UE is not to wake up during the next ON time during the DRX cycle, which may be, e.g., the wireless transceiver 1310 and one or more processors 1302 with dedicated hardware or implementing executable code or software instructions in memory 1320 such as the position report module 1340.

Figure 14:
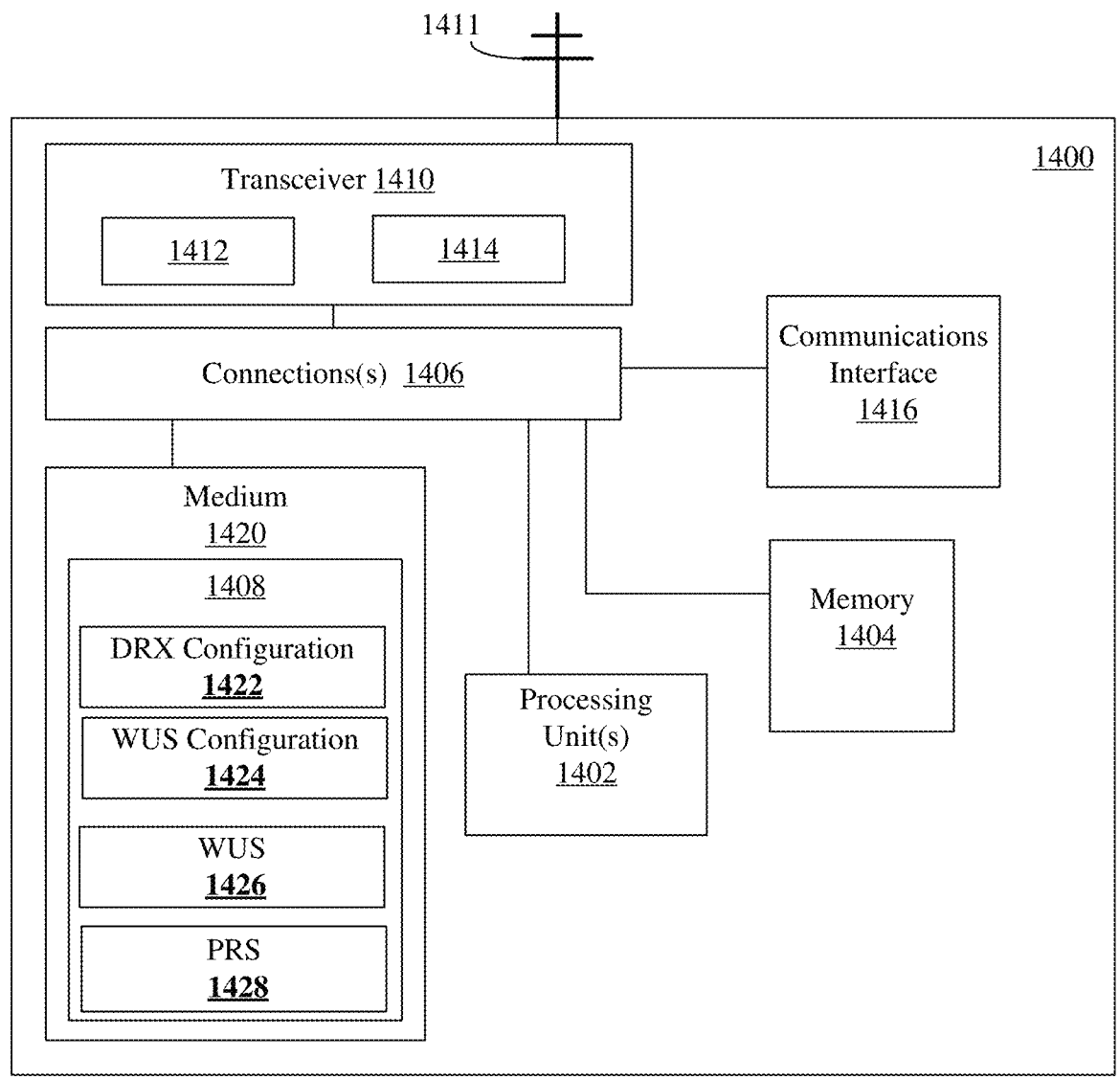
FIG. 14 shows a schematic block diagram illustrating certain exemplary features of a base station enabled to support positioning of a UE that is operating in a DRX mode and receiving DL PRS after receiving a wake-up signal.

FIG. 14 shows a schematic block diagram illustrating certain exemplary features of a base station 1400, e.g., base station 102 in FIG. 1, enabled to support positioning of a UE that is operating in DRX mode and receiving DL PRS after receiving a WUS, as described herein. Base station 1400 may, for example, include one or more processors 1402, memory 1404, an external interface, which may include a transceiver 1410 (e.g., wireless network interface) and a communications interface 1416 (e.g., wireline or wireless network interface to other base stations and/or the core network), which may be operatively coupled with one or more connections 1406 (e.g., buses, lines, fibers, links, etc.) to non-transitory computer readable medium 1420 and memory 1404. The base station 1400 may further include additional items, which are not shown, such as a user interface that may include e.g., a display, a keypad or other input device, such as virtual keypad on the display, through which a user may interface with the UE, or a satellite positioning system receiver. In certain example implementations, all or part of base station 1400 may take the form of a chipset, and/or the like. Transceiver 1410 may, for example, include a transmitter 1412 enabled to transmit one or more signals over one or more types of wireless communication networks and a receiver 1414 to receive one or more signals transmitted over the one or more types of wireless communication networks. The communications interface 1416 may be a wired or wireless interface capable of connecting to other base stations in the RAN or network entities, such as a location server 172 shown in FIG. 1.

In some embodiments, base station 1400 may include antenna 1411, which may be internal or external. Antenna 1411 may be used to transmit and/or receive signals processed by transceiver 1410. In some embodiments, antenna 1411 may be coupled to transceiver 1410. In some embodiments, measurements of signals received (transmitted) by base station 1400 may be performed at the point of connection of the antenna 1411 and transceiver 1410. For example, the measurement point of reference for received (transmitted) RF signal measurements may be an input (output) terminal of the receiver 1414 (transmitter 1412) and an output (input) terminal of the antenna 1411. In a base station 1400 with multiple antennas 1411 or antenna arrays, the antenna connector may be viewed as a virtual point representing the aggregate output (input) of multiple antennas. In some embodiments, base station 1400 may measure received signals including signal strength and TOA measurements and the raw measurements may be processed by the one or more processors 1402.

The one or more processors 1402 may be implemented using a combination of hardware, firmware, and software. For example, the one or more processors 1402 may be configured to perform the functions discussed herein by implementing one or more instructions or program code 1408 on a non-transitory computer readable medium, such as medium 1420 and/or memory 1404. In some embodiments, the one or more processors 1402 may represent one or more circuits configurable to perform at least a portion of a data signal computing procedure or process related to the operation of base station 1400.

The medium 1420 and/or memory 1404 may store instructions or program code 1408 that contain executable code or software instructions that when executed by the one or more processors 1402 cause the one or more processors 1402 to operate as a special purpose computer programmed to perform the techniques disclosed herein. As illustrated in base station 1400, the medium 1420 and/or memory 1404 may include one or more components or modules that may be implemented by the one or more processors 1402 to perform the methodologies described herein. While the components or modules are illustrated as software in medium 1420 that is executable by the one or more processors 1402, it should be understood that the components or modules may be stored in memory 1404 or may be dedicated hardware either in the one or more processors 1402 or off the processors.

A number of software modules and data tables may reside in the medium 1420 and/or memory 1404 and be utilized by the one or more processors 1402 in order to manage both communications and the functionality described herein. It should be appreciated that the organization of the contents of the medium 1420 and/or memory 1404 as shown in base station 1400 is merely exemplary, and as such the functionality of the modules and/or data structures may be combined, separated, and/or be structured in different ways depending upon the implementation of the base station 1400.

The medium 1420 and/or memory 1404 may include a DRX configuration module 1422 that when implemented by the one or more processors 1402 configures the one or more processors 1402 to transmit a DRX configuration message via transceiver 1410, e.g., to a UE via an RRC message. The DRX configuration module 1422 may further configure the one or more processors to transmit the DRX configuration for the UE to a location server, via communications interface 1416.

The medium 1420 and/or memory 1404 may include a WUS configuration module 1424 that when implemented by the one or more processors 1402 configures the one or more processors 1402 to transmit a WUS configuration message via transceiver 1410, e.g., to a UE via an RRC message. The WUS configuration module 1424 may further configure the one or more processors to transmit the WUS configuration for the UE to a location server, via communications interface 1416.

The medium 1420 and/or memory 1404 may include a WUS module 1426 that when implemented by the one or more processors 1402 configures the one or more processors 1402 to transmit a wake-up signal to a UE via the transceiver 1410. The wake-up signal indicating whether the UE is to wake up or not during a next ON time during the DRX cycle to monitor for communication signals, such as data signals or control signals. The WUS module 1426 may further configure the one or more processors to transmit the wake-up signal for the UE to a location server, via communications interface 1416.

The medium 1420 and/or memory 1404 may include a PRS module 1428 that when implemented by the one or more processors 1402 configures the one or more processors 1402 to transmit DL PRS to the UE.

The methodologies described herein may be implemented by various means depending upon the application. For example, these methodologies may be implemented in hardware, firmware, software, or any combination thereof. For a hardware implementation, the one or more processors 1402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1420 or memory 1404 that is connected to and executed by the one or more processors 1402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1408 on a non-transitory computer readable medium, such as medium 1420 and/or memory 1404. Examples include computer readable media encoded with a data structure and computer readable media encoded with a computer program 1408. For example, the non-transitory computer readable medium including program code 1408 stored thereon may include program code 1408 to support OTDOA measurements in a manner consistent with disclosed embodiments. Non-transitory computer readable medium 1420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1408 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1420, instructions and/or data may be provided as signals on transmission media included in a communication apparatus. For example, a communication apparatus may include a transceiver 1410 having signals indicative of instructions and data. The instructions and data are configured to cause one or more processors to implement the functions outlined in the claims. That is, the communication apparatus includes transmission media with signals indicative of information to perform disclosed functions.

Memory 1404 may represent any data storage mechanism. Memory 1404 may include, for example, a primary memory and/or a secondary memory. Primary memory may include, for example, a random access memory, read only memory, etc. While illustrated in this example as being separate from one or more processors 1402, it should be understood that all or part of a primary memory may be provided within or otherwise co-located/coupled with the one or more processors 1402. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1420. As such, in certain example implementations, the methods and/or apparatuses presented herein may take the form in whole or part of a computer readable medium 1420 that may include computer implementable code 1408 stored thereon, which if executed by one or more processors 1402 may be operatively enabled to perform all or portions of the example operations as described herein. Computer readable medium 1420 may be a part of memory 1404.

A base station in a wireless network serving a user equipment (UE), the UE configured for wireless communication and operating in a discontinuous reception (DRX) mode, may include a means for transmitting to the UE a wake-up signal indicating that the UE is not to wake up during a next ON time during a DRX cycle to monitor for communication signals, the communication signals comprising data signals or control signals or both, which may be, e.g., the wireless transceiver 1410 and one or more processors 1402 with dedicated hardware or implementing executable code or software instructions in memory 1420 such as the WUS module 1426. The UE may be configured to receive positioning reference signals (PRSs), and in response to the configuration to receive PRS and the wake-up signal, the UE performs one of: A) remaining in a DRX sleep mode and not receiving the PRS; or B) transitioning to a DRX ON mode to receive the PRS but not monitoring for the communication signals; or C) transitioning to the DRX ON mode to receive the PRS and monitoring for the communication signals. A means for transmitting to a location server an indication of the wake-up signal indicating that the UE is not to wake up during the next ON time during the DRX cycle to monitor for the communication signals may be, e.g., the communications interface 1416 and one or more processors 1402 with dedicated hardware or implementing executable code or software instructions in memory 1420 such as the WUS module 1426.

In one implementation, the base station may include a means for transmitting a DRX configuration to the UE, which may be, e.g., the wireless transceiver 1410 and one or more processors 1402 with dedicated hardware or implementing executable code or software instructions in memory 1420 such as the DRX configuration module 1422. A means for transmitting the DRX configuration to the location server may be, e.g., the communications interface 1416 and one or more processors 1402 with dedicated hardware or implementing executable code or software instructions in memory 1420 such as the DRX configuration module 1422.

In one implementation, the base station may include a means for transmitting to the location server an indication of when the UE is configured to monitor the wake-up signal and when the wake-up signal is ON or OFF, which may be, e.g., the communications interface 1416 and one or more processors 1402 with dedicated hardware or implementing executable code or software instructions in memory 1420 such as the WUS configuration module 1424 and the WUS module 1426.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method of wireless communication performed by a user equipment (UE) operating in a discontinuous reception (DRX) mode, comprising:
    receiving a positioning reference signal (PRS) configuration for receiving PRS;
    receiving a wake-up signal from a serving base station indicating that the UE is not to wake up during a next ON time during a DRX cycle to monitor for communication signals, the communication signals comprising data signals or control signals or both;
    in response to the PRS configuration and the wake-up signal, performing one of:
    A) remaining in a DRX sleep mode and not receiving the PRS; or
    B) transitioning to a DRX ON mode to receive the PRS but not monitoring for the communication signals; or
    C) transitioning to the DRX ON mode to receive the PRS and monitoring for the communication signals.

2. The method of clause 1, wherein the PRS is scheduled to be received during the next ON time during the DRX cycle.

3. The method of either of clauses 1 or 2, wherein the performance of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on time domain behavior of the PRS, wherein time-domain behavior comprises the PRS being periodic, semi-persistent, or aperiodic.

4. The method of clause 3, wherein the UE performs A) remaining in the DRX sleep mode and not receiving the PRS when the PRS is configured to be periodic or semi-periodic, and the UE performs B) transitioning to the DRX ON mode to receive the PRS but not monitoring for the communication signals or C) transitioning to the DRX
ON mode to receive the PRS and monitoring for the communication signals when the PRS is configured to be aperiodic.

5. The method of any of clauses 1-4, wherein the performance of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on a transmission point of the PRS.

6. The method of clause 5, wherein the UE performs A) remaining in the DRX sleep mode and not receiving the PRS when the PRS is configured to be transmitted by the serving base station, and the UE performs B) transitioning to the DRX ON mode to receive the PRS but not monitoring for the communication signals or C) transitioning to the DRX ON mode to receive the PRS and monitoring for the communication signals when the PRS is configured to be transmitted by a neighboring transmission reception point (TRP).

7. The method of clause 5, wherein the UE performs B) transitioning to the DRX ON mode to receive the PRS but not monitoring for the communication signals or C) transitioning to the DRX ON mode to receive the PRS and monitoring for the communication signals when the PRS is configured to be transmitted by a reference base station, and the UE performs A) remaining in the DRX sleep mode and not receiving the PRS when the PRS is configured to be transmitted by a neighboring TRP.

8. The method of any of clauses 1-7, wherein the performance of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on one or more of the UE performing inter-frequency or intra-frequency measurement of the PRS or a measurement gap configuration.

9. The method of clause 8, wherein the UE performs B) transitioning to the DRX ON mode to receive the PRS but not monitoring for the communication signals when the PRS is configured to be intra-frequency with an active bandwidth part and requires a measurement gap or the UE performs C) transitioning to the DRX ON mode to receive the PRS and monitoring for the communication signals when the PRS is configured to be inter-frequency with the active bandwidth part and does not require the measurement gap.

10. The method of any of clauses 1-9, wherein the PRS is part of a subset of PRS for which the UE is configured to perform A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.

11. The method of clause 10, wherein the subset of PRS comprises a subset of PRS resources, PRS sets, PRS frequency layers, or PRS transmitted by transmission reception points (TRPs), or combination thereof.

12. The method of any of clauses 1-11, wherein the wake-up signal is an indicator in a downlink control information (DCI) message, wherein the UE performs A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals based on information associated with the wake-up signal in the DCI message.

13. The method of clause 12, wherein the information associated with the wake-up signal in the DCI message is a joint bitfield with a channel state information (CSI) request or CSI-reference signal (RS) triggering or a combination thereof, or is a dedicated bitfield for indicating whether the UE performs A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.

14. The method of any of clauses 1-13, further comprising:
receiving one or more of a message from the serving base station, a message from a location server, or a combination thereof, that configures the UE to perform A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.

15. The method of clause 14, wherein the message from the location server configures the UE to transition to the DRX ON mode to receive the PRS in response to the wake-up signal indicating that the UE is not to wake up, and the message from the serving base station configures the UE to not monitor for the communication signals or to monitor for the communication signals.

16. The method of any of clauses 1-15, wherein the wake-up signal indicating that the UE is not to wake up during the next ON time during the DRX cycle to monitor for data signals or control signals is provided to a location server from the serving base station.

17. The method of clause 16, further comprising receiving a DRX configuration from the serving base station, wherein the DRX configuration is provided to the location server from the serving base station.

18. The method of clause 16, wherein the serving base station provides to the location server an indication of when the UE is configured to monitor for the wake-up signal and when the wake-up signal is ON or OFF.

19. The method of any of clauses 1-18, further comprising transmitting a report to a location server of receipt of the wake-up signal indicating that the UE is not to wake up during the next ON time during the DRX cycle.

20. The method of clause 19, wherein the report of the receipt of the wake-up signal is in a positioning measurement report.

21. A user equipment (UE) configured for wireless communication and operating in a discontinuous reception (DRX) mode, comprising:
a transceiver for wirelessly receiving and sending messages;
at least one memory; and
at least one processor coupled to the transceiver and the at least one memory, the at least one processor configured to:
receive, via the transceiver, a positioning reference signal (PRS) configuration for receiving PRS;
receive, via the transceiver, a wake-up signal from a serving base station indicating that the UE is not to wake up during a next ON time during a DRX cycle to monitor for communication signals, the communication signals comprising data signals or control signals or both;
in response to the PRS configuration and the wake-up signal, perform one of:
A) remain in a DRX sleep mode and not receive the PRS; or
B) transition to a DRX ON mode to receive the PRS but not monitor for the communication signals; or
C) transition to the DRX ON mode to receive the PRS and monitor for the communication signals.

22. The UE of clause 21, wherein the PRS is scheduled to be received during the next ON time during the DRX cycle.

23. The UE of either of clauses 21 or 22, wherein the performance of A) remain in the DRX sleep mode and not receive the PRS, B) transition to the DRX ON mode to receive the PRS but not monitor for the communication signals, or C) transition to the DRX ON mode to receive the PRS and monitor for the communication signals is dependent on time domain behavior of the PRS, wherein time-domain behavior comprises the PRS being periodic, semi-persistent, or aperiodic.

24. The UE of clause 23, wherein the UE performs A) remain in the DRX sleep mode and not receive the PRS when the PRS is configured to be periodic or semi-periodic, and the UE performs B) transition to the DRX ON mode to receive the PRS but not monitor for the communication signals or C) transition to the DRX ON mode to receive the PRS and monitor for the communication signals when the PRS is configured to be aperiodic.

25. The UE of any of clauses 21-24, wherein the performance of A) remain in the DRX sleep mode and not receive the PRS, B) transition to the DRX ON mode to receive the PRS but not monitor for the communication signals, or C) transition to the DRX ON mode to receive the PRS and monitor for the communication signals is dependent on a transmission point of the PRS.

26. The UE of clause 25, wherein the UE performs A) remain in the DRX sleep mode and not receive the PRS when the PRS is configured to be transmitted by the serving base station, and the UE performs B) transition to the DRX ON mode to receive the PRS but not monitor for the communication signals or C) transition to the DRX ON mode to receive the PRS and monitor for the communication signals when the PRS is configured to be transmitted by a neighboring transmission reception point (TRP).
27. The UE of clause 25, wherein the UE performs B) transition to the DRX ON mode to receive the PRS but not monitor for the communication signals or C) transition to the DRX ON mode to receive the PRS and monitor for the communication signals when the PRS is configured to be transmitted by a reference base station, and the UE performs A) remain in the DRX sleep mode and not receive the PRS when the PRS is configured to be transmitted by a neighboring TRP.
28. The UE of any of clauses 21-27, wherein the performance of A) remain in the DRX sleep mode and not receive the PRS, B) transition to the DRX ON mode to receive the PRS but not monitor for the communication signals, or C) transition to the DRX ON mode to receive the PRS and monitor for the communication signals is dependent on one or more of the UE performing inter-frequency or intra-frequency measurement of the PRS or a measurement gap configuration.
29. The UE of clause 28, wherein the UE performs B) transition to the DRX ON mode to receive the PRS but not monitor for the communication signals when the PRS is configured to be intra-frequency with an active bandwidth part and requires a measurement gap or the UE performs C) transition to the DRX ON mode to receive the PRS and monitor for the communication signals when the PRS is configured to be inter-frequency with the active bandwidth part and does not require the measurement gap.
30. The UE of any of clauses 21-29, wherein the PRS is part of a subset of PRS for which the UE is configured to perform A) remain in the DRX sleep mode and not receive the PRS, B) transition to the DRX ON mode to receive the PRS but not monitor for the communication signals, or C) transition to the DRX ON mode to receive the PRS and monitor for the communication signals.
31. The UE of clause 30, wherein the subset of PRS comprises a subset of PRS resources, PRS sets, PRS frequency layers, or PRS transmitted by transmission reception points (TRPs), or combination thereof.
32. The UE of any of clauses 21-31, wherein the wake-up signal is an indicator in a downlink control information (DCI) message, wherein the UE performs A) remain in the DRX sleep mode and not receive the PRS, B) transition to the DRX ON mode to receive the PRS but not monitor for the communication signals, or C) transition to the DRX ON mode to receive the PRS and monitor for the communication signals based on information associated with the wake-up signal in the DCI message.
33. The UE of clause 32, wherein the information associated with the wake-up signal in the DCI message is a joint bitfield with a channel state information (CSI) request or CSI-reference signal (RS) triggering or a combination thereof, or is a dedicated bitfield for indicating whether the UE performs A) remain in the DRX sleep mode and not receive the PRS, B) transition to the DRX ON mode to receive the PRS but not monitor for the communication signals, or C) transition to the DRX ON mode to receive the PRS and monitor for the communication signals.
34. The UE of any of clauses 21-33, wherein the at least one processor is further configured to:
receive, via the transceiver, one or more of a message from the serving base station, a message from a location server, or a combination thereof, that configures the UE to perform A) remain in the DRX sleep mode and not receive the PRS, B) transition to the DRX ON mode to receive the PRS but not monitor for the communication signals, or C) transition to the DRX ON mode to receive the PRS and monitor for the communication signals.
35. The UE of clause 34, wherein the message from the location server configures the UE to transition to the DRX ON mode to receive the PRS in response to the wake-up signal indicating that the UE is not to wake up, and the message from the serving base station configures the UE to not monitor for the communication signals or to monitor for the communication signals.
36. The UE of any of clauses 21-35, wherein the wake-up signal indicating that the UE is not to wake up during the next ON time during the DRX cycle to monitor for data signals or control signals is provided to a location server from the serving base station.
37. The UE of clause 36, wherein the at least one processor is further configured to receive a DRX configuration from the serving base station, wherein the DRX configuration is provided to the location server from the serving base station.
38. The UE of clause 36, wherein the serving base station provides to the location server an indication of when the UE is configured to monitor for the wake-up signal and when the wake-up signal is ON or OFF.
39. The UE of any of clauses 21-38, wherein the at least one processor is further configured to transmit a report to a location server of receipt of the wake-up signal indicating that the UE is not to wake up during the next ON time during the DRX cycle.
40. The UE of clause 39, wherein the report of the receipt of the wake-up signal is a positioning measurement report.
41. A user equipment (UE) configured for wireless communication and operating in a discontinuous reception (DRX) mode, comprising:
means for receiving a positioning reference signal (PRS) configuration for receiving PRS;
means for receiving a wake-up signal from a serving base station indicating that the UE is not to wake up during a next ON time during a DRX cycle to monitor for communication signals, the communication signals comprising data signals or control signals or both;
means for performing, in response to the PRS configuration and the wake-up signal, one of:
A) remaining in a DRX sleep mode and not receiving the PRS; or
B) transitioning to a DRX ON mode to receive the PRS but not monitoring for the communication signals; or
C) transitioning to the DRX ON mode to receive the PRS and monitoring for the communication signals.
42. The UE of clause 41, wherein the PRS is scheduled to be received during the next ON time during the DRX cycle.
43. The UE of any of clauses 41 or 42, wherein the means for performing one of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on time domain behavior of the PRS, wherein time-domain behavior comprises the PRS being periodic, semi-persistent, or aperiodic.
44. The UE of clause 43, wherein the UE performs A) remaining in the DRX sleep mode and not receiving the PRS when the PRS is configured to be periodic or semi-periodic, and the UE performs B) transitioning to the DRX ON mode to receive the PRS but not monitoring for the communication signals or C) transitioning to the DRX ON mode to receive the PRS and monitoring for the communication signals when the PRS is configured to be aperiodic.
45. The UE of any of clauses 41-44, wherein the means for performing one of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on a transmission point of the PRS.
46. The UE of clause 45, wherein the UE performs A) remaining in the DRX sleep mode and not receiving the PRS when the PRS is configured to be transmitted by the serving base station, and the UE performs B) transitioning to the DRX ON mode to receive the PRS but not monitoring for the communication signals or C) transitioning to the DRX ON mode to receive the PRS and monitoring for the communication signals when the PRS is configured to be transmitted by a neighboring transmission reception point (TRP).
47. The UE of clause 45, wherein the UE performs B) transitioning to the DRX ON mode to receive the PRS but not monitoring for the communication signals or C) transitioning to the DRX ON mode to receive the PRS and monitoring for the communication signals when the PRS is configured to be transmitted by a reference base station, and the UE performs A) remaining in the DRX sleep mode and not receiving the PRS when the PRS is configured to be transmitted by a neighboring TRP.
48. The UE of any of clauses 41-47, wherein the means for performing one of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on one or more of the UE performing inter-frequency or intra-frequency measurement of the PRS or a measurement gap configuration.
49. The UE of clause 48, wherein the UE performs B) transitioning to the DRX ON mode to receive the PRS but not monitoring for the communication signals when the PRS is configured to be intra-frequency with an active bandwidth part and requires a measurement gap or the UE performs C) transitioning to the DRX ON mode to receive the PRS and monitoring for the communication signals when the PRS is configured to be inter-frequency with the active bandwidth part and does not require the measurement gap.
50. The UE of any of clauses 41-49, wherein the PRS is part of a subset of PRS for which the UE is configured to perform A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.
51. The UE of clause 50, wherein the subset of PRS comprises a subset of PRS resources, PRS sets, PRS frequency layers, or PRS transmitted by transmission reception points (TRPs), or combination thereof.
52. The UE of any of clauses 41-51, wherein the wake-up signal is an indicator in a downlink control information (DCI) message, wherein the UE performs A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals based on information associated with the wake-up signal in the DCI message.
53. The UE of clause 52, wherein the information associated with the wake-up signal in the DCI message is a joint bitfield with a channel state information (CSI) request or CSI-reference signal (RS) triggering or a combination thereof, or is a dedicated bitfield for indicating whether the UE performs A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.
54. The UE of any of clauses 41-53, further comprising: means for receiving one or more of a message from the serving base station, a message from a location server, or a combination thereof, that configures the UE to perform A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.
55. The UE of clause 54, wherein the message from the location server configures the UE to transition to the DRX ON mode to receive the PRS in response to the wake-up signal indicating that the UE is not to wake up, and the message from the serving base station configures the UE to not monitor for the communication signals or to monitor for the communication signals.
56. The UE of any of clauses 41-55, wherein the wake-up signal indicating that the UE is not to wake up during the next ON time during the DRX cycle to monitor for data signals or control signals is provided to a location server from the serving base station.
57. The UE of clause 56, further comprising means for receiving a DRX configuration from the serving base station, wherein the DRX configuration is provided to the location server from the serving base station.
58. The UE of clause 56, wherein the serving base station provides to the location server an indication of when the UE is configured to monitor for the wake-up signal and when the wake-up signal is ON or OFF.
59. The UE of any of clauses 41-58, further comprising means for transmitting a report to a location server of receipt of the wake-up signal indicating that the UE is not to wake up during the next ON time during the DRX cycle.
60. The UE of clause 59, wherein the report of the receipt of the wake-up signal is in a positioning measurement report.

61. A non-transitory computer readable storage medium including program code stored thereon, the program code is operable to configure at least one processor in a user equipment (UE) configured for wireless communication and operating in a discontinuous reception (DRX) mode, comprising:
program code to receive a positioning reference signal (PRS) configuration for receiving PRS;
program code to receive a wake-up signal from a serving base station indicating that the UE is not to wake up during a next ON time during a DRX cycle to monitor for communication signals, the communication signals comprising data signals or control signals or both;
program code to perform, in response to the PRS configuration and the wake-up signal, one of:
D) remaining in a DRX sleep mode and not receiving the PRS; or
E) transitioning to a DRX ON mode to receive the PRS but not monitoring for the communication signals; or
F) transitioning to the DRX ON mode to receive the PRS and monitoring for the communication signals.

62. A method of wireless communication for a user equipment (UE) operating in a discontinuous reception (DRX) mode performed by a base station in a wireless network serving the UE, comprising:
transmitting to the UE a wake-up signal indicating that the UE is not to wake up during a next ON time during a DRX cycle to monitor for communication signals, the communication signals comprising data signals or control signals or both;
wherein the UE is configured to receive positioning reference signals (PRSs), and in response to the configuration to receive PRS and the wake-up signal, the UE performs one of:
A) remaining in a DRX sleep mode and not receiving the PRS; or
B) transitioning to a DRX ON mode to receive the PRS but not monitoring for the communication signals; or
C) transitioning to the DRX ON mode to receive the PRS and monitoring for the communication signals;
transmitting to a location server an indication of the wake-up signal indicating that the UE is not to wake up during the next ON time during the DRX cycle to monitor for the communication signals.

63. The method of clause 62, further comprising:
transmitting a DRX configuration to the UE;
transmitting the DRX configuration to the location server.

64. The method of either of clauses 62 or 63, further comprising:
transmitting to the location server an indication of when the UE is configured to monitor the wake-up signal and when the wake-up signal is ON or OFF.

65. A base station in a wireless network serving a user equipment (UE), the UE configured for wireless communication and operating in a discontinuous reception (DRX) mode, comprising:
a transceiver for wirelessly receiving and sending messages with UEs;
a communication interface for receiving and sending messages to entities within the wireless network;
at least one memory; and
at least one processor coupled to the transceiver, the communication interface, and the at least one memory, the at least one processor configured to:
transmit to the UE, via the transceiver, a wake-up signal indicating that the UE is not to wake up during a next ON time during a DRX cycle to monitor for communication signals, the communication signals comprising data signals or control signals or both;
wherein the UE is configured to receive positioning reference signals (PRSs), and in response to the configuration to receive PRS and the wake-up signal, the UE performs one of:
A) remaining in a DRX sleep mode and not receiving the PRS; or
B) transitioning to a DRX ON mode to receive the PRS but not monitoring for the communication signals; or
C) transitioning to the DRX ON mode to receive the PRS and monitoring for the communication signals;
transmit to a location server, via the communications interface, an indication of the wake-up signal indicating that the UE is not to wake up during the next ON time during the DRX cycle to monitor for the communication signals.

66. The base station of clause 65, wherein the at least one processor is further configured to:
transmit, via the transceiver, a DRX configuration to the UE;
transmit, via the communications interface, the DRX configuration to the location server.

67. The base station of either of clauses 65 or 66, wherein the at least one processor is further configured to:
transmit to the location server, via the communications interface, an indication of when the UE is configured to monitor the wake-up signal and when the wake-up signal is ON or OFF.

68. A base station in a wireless network serving a user equipment (UE), the UE configured for wireless communication and operating in a discontinuous reception (DRX) mode performed, comprising:
means for transmitting to the UE a wake-up signal indicating that the UE is not to wake up during a next ON time during a DRX cycle to monitor for communication signals, the communication signals comprising data signals or control signals or both;
wherein the UE is configured to receive positioning reference signals (PRSs), and in response to the configuration to receive PRS and the wake-up signal, the UE performs one of:
A) remaining in a DRX sleep mode and not receiving the PRS; or
B) transitioning to a DRX ON mode to receive the PRS but not monitoring for the communication signals; or
C) transitioning to the DRX ON mode to receive the PRS and monitoring for the communication signals;
means for transmitting to a location server an indication of the wake-up signal indicating that the UE is not to wake up during the next ON time during the DRX cycle to monitor for the communication signals.

69. The base station of clause 68, further comprising:
means for transmitting a DRX configuration to the UE;
means for transmitting the DRX configuration to the location server.

70. The base station of either of clauses 68 or 69, further comprising:
means for transmitting to the location server an indication of when the UE is configured to monitor the wake-up signal and when the wake-up signal is ON or OFF.

71. A non-transitory computer readable storage medium including program code stored thereon, the program code is operable to configure at least one processor in a base station in a wireless network serving a user equipment (UE), the UE configured for wireless communication and operating in a discontinuous reception (DRX) mode performed, comprising:

program code to transmit to the UE a wake-up signal indicating that the UE is not to wake up during a next ON time during a DRX cycle to monitor for communication signals, the communication signals comprising data signals or control signals or both;

wherein the UE is configured to receive positioning reference signals (PRSs), and in response to the configuration to receive PRS and the wake-up signal, the UE performs one of:

A) remaining in a DRX sleep mode and not receiving the PRS; or

B) transitioning to a DRX ON mode to receive the PRS but not monitoring for the communication signals; or C) transitioning to the DRX ON mode to receive the PRS and monitoring for the communication signals;

program code to transmit to a location server an indication of the wake-up signal indicating that the UE is not to wake up during the next ON time during the DRX cycle to monitor for the communication signals.

Therefore, it is intended that claimed subject matter not be limited to the particular examples disclosed, but that such claimed subject matter may also include all aspects falling within the scope of appended claims, and equivalents thereof.

What is claimed is:

1. A method of wireless communication performed by a user equipment (UE) operating in a discontinuous reception (DRX) mode, comprising:

receiving a positioning reference signal (PRS) configuration for receiving PRS;

receiving a wake-up signal from a serving base station indicating that the UE is not to wake up during a next ON time during a DRX cycle to monitor for communication signals, the communication signals comprising data signals or control signals or both;

in response to the PRS configuration and the wake-up signal, performing one of:

A) remaining in a DRX sleep mode and not receiving the PRS; or

B) transitioning to a DRX ON mode to receive the PRS but not monitoring for the communication signals; or C) transitioning to the DRX ON mode to receive the PRS and monitoring for the communication signals.

2. The method of claim 1, wherein the PRS is scheduled to be received during the next ON time during the DRX cycle.

3. The method of claim 1, wherein the performance of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on time domain behavior of the PRS, wherein the time-domain behavior comprises the PRS being periodic, semi-persistent, or aperiodic.

4. The method of claim 3, wherein the UE performs A) remaining in the DRX sleep mode and not receiving the PRS when the PRS is configured to be periodic or semi-periodic, and the UE performs B) transitioning to the DRX ON mode to receive the PRS but not monitoring for the communication signals or C) transitioning to the DRX ON mode to receive the PRS and monitoring for the communication signals when the PRS is configured to be the aperiodic.

5. The method of claim 1, wherein the performance of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on a transmission point of the PRS.

6. The method of claim 5, wherein the UE performs A) remaining in the DRX sleep mode and not receiving the PRS when the PRS is configured to be transmitted by the serving base station, and the UE performs B) transitioning to the DRX ON mode to receive the PRS but not monitoring for the communication signals or C) transitioning to the DRX ON mode to receive the PRS and monitoring for the communication signals when the PRS is configured to be transmitted by a neighboring transmission reception point (TRP).

7. The method of claim 5, wherein the UE performs B) transitioning to the DRX ON mode to receive the PRS but not monitoring for the communication signals or C) transitioning to the DRX ON mode to receive the PRS and monitoring for the communication signals when the PRS is configured to be transmitted by a reference base station, and the UE performs A) remaining in the DRX sleep mode and not receiving the PRS when the PRS is configured to be transmitted by a neighboring TRP.

8. The method of claim 1, wherein the performance of A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals is dependent on one or more of the UE performing inter-frequency or intra-frequency measurement of the PRS or a measurement gap configuration.

9. The method of claim 8, wherein the UE performs B) transitioning to the DRX ON mode to receive the PRS but not monitoring for the communication signals when the PRS is configured to be intra-frequency with an active bandwidth part and requires a measurement gap or the UE performs C) transitioning to the DRX ON mode to receive the PRS and monitoring for the communication signals when the PRS is configured to be inter-frequency with the active bandwidth part and does not require the measurement gap.

10. The method of claim 1, wherein the PRS is part of a subset of PRS for which the UE is configured to perform A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.

11. The method of claim 10, wherein the subset of PRS comprises a subset of PRS resources, PRS sets, PRS frequency layers, or PRS transmitted by transmission reception points (TRPs), or combination thereof.

12. The method of claim 1, wherein the wake-up signal is an indicator in a downlink control information (DCI) message, wherein the UE performs A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals based on information associated with the wake-up signal in the DCI message.

13. The method of claim 12, wherein the information associated with the wake-up signal in the DCI message is a joint bitfield with a channel state information (CSI) request or CSI-reference signal (RS) triggering or a combination thereof, or is a dedicated bitfield for indicating whether the UE performs A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.

14. The method of claim 1, further comprising:
receiving one or more of a message from the serving base station, a message from a location server, or a combination thereof, that configures the UE to perform A) remaining in the DRX sleep mode and not receiving the PRS, B) transitioning to the DRX ON mode to receive the PRS but not monitoring for the communication signals, or C) transitioning to the DRX ON mode to receive the PRS and monitoring for the communication signals.

15. The method of claim 14, wherein the message from the location server configures the UE to transition to the DRX ON mode to receive the PRS in response to the wake-up signal indicating that the UE is not to wake up, and the message from the serving base station configures the UE to not monitor for the communication signals or to monitor for the communication signals.

16. The method of claim 1, wherein the wake-up signal indicating that the UE is not to wake up during the next ON time during the DRX cycle to monitor for data signals or control signals is provided to a location server from the serving base station.

17. The method of claim 16, further comprising receiving a DRX configuration from the serving base station, wherein the DRX configuration is provided to the location server from the serving base station.

18. The method of claim 16, wherein the serving base station provides to the location server an indication of when the UE is configured to monitor for the wake-up signal and when the wake-up signal is ON or OFF.

19. The method of claim 1, further comprising transmitting a report to a location server of receipt of the wake-up signal indicating that the UE is not to wake up during the next ON time during the DRX cycle.

20. The method of claim 19, wherein the report of the receipt of the wake-up signal is in a positioning measurement report.

21. A user equipment (UE) configured for wireless communication and operating in a discontinuous reception (DRX) mode, comprising:
a transceiver for wirelessly receiving and sending messages;
at least one memory; and
at least one processor coupled to the transceiver and the at least one memory, the at least one processor configured to:
receive, via the transceiver, a positioning reference signal (PRS) configuration for receiving PRS;
receive, via the transceiver, a wake-up signal from a serving base station indicating that the UE is not to wake up during a next ON time during a DRX cycle to monitor for communication signals, the communication signals comprising data signals or control signals or both;
in response to the PRS configuration and the wake-up signal, perform one of:
A) remain in a DRX sleep mode and not receive the PRS; or
B) transition to a DRX ON mode to receive the PRS but not monitor for the communication signals; or
C) transition to the DRX ON mode to receive the PRS and monitor for the communication signals.

22. The UE of claim 21, wherein the PRS is scheduled to be received during the next ON time during the DRX cycle.

23. The UE of claim 21, wherein the performance of A) remain in the DRX sleep mode and not receive the PRS, B) transition to the DRX ON mode to receive the PRS but not monitor for the communication signals, or C) transition to the DRX ON mode to receive the PRS and monitor for the communication signals is dependent on time domain behavior of the PRS, wherein the time-domain behavior comprises the PRS being periodic, semi-persistent, or aperiodic.

24. The UE of claim 23, wherein the VE performs A) remain in the DRX sleep mode and not receive the PRS when the PRS is configured to be periodic or semi-periodic, and the UE performs B) transition to the DRX ON mode to receive the PRS but not monitor for the communication signals or C) transition to the DRX ON mode to receive the PRS and monitor for the communication signals when the PRS is configured to be the aperiodic.

25. The UE of claim 21, wherein the performance of A) remain in the DRX sleep mode and not receive the PRS, B) transition to the DRX ON mode to receive the PRS but not monitor for the communication signals, or C) transition to the DRX ON mode to receive the PRS and monitor for the communication signals is dependent on a transmission point of the PRS.

26. The UE of claim 25, wherein the UE performs A) remain in the DRX sleep mode and not receive the PRS when the PRS is configured to be transmitted by the serving base station, and the UE performs B) transition to the DRX ON mode to receive the PRS but not monitor for the communication signals or C) transition to the DRX ON mode to receive the PRS and monitor for the communication signals when the PRS is configured to be transmitted by a neighboring transmission reception point (TRP).

27. The UE of claim 25, wherein the UE performs B) transition to the DRX ON mode to receive the PRS but not monitor for the communication signals or C) transition to the DRX ON mode to receive the PRS and monitor for the communication signals when the PRS is configured to be transmitted by a reference base station, and the UE performs A) remain in the DRX sleep mode and not receive the PRS when the PRS is configured to be transmitted by a neighboring TRP.

28. The UE of claim 21, wherein the performance of A) remain in the DRX sleep mode and not receive the PRS, B) transition to the DRX ON mode to receive the PRS but not monitor for the communication signals, or C) transition to the DRX ON mode to receive the PRS and monitor for the communication signals is dependent on one or more of the UE performing inter-frequency or intra-frequency measurement of the PRS or a measurement gap configuration.

29. The UE of claim 28, wherein the UE performs B) transition to the DRX ON mode to receive the PRS but not monitor for the communication signals when the PRS is configured to be intra-frequency with an active bandwidth part and requires a measurement gap or the UE performs C) transition to the DRX ON mode to receive the PRS and monitor for the communication signals when the PRS is configured to be inter-frequency with the active bandwidth part and does not require the measurement gap.

30. The UE of claim 21, wherein the PRS is part of a subset of PRS for which the UE is configured to perform A) remain in the DRX sleep mode and not receive the PRS, B) transition to the DRX ON mode to receive the PRS but not monitor for the communication signals, or C) transition to the DRX ON mode to receive the PRS and monitor for the communication signals.

31. The UE of claim 30, wherein the subset of PRS comprises a subset of PRS resources, PRS sets, PRS frequency layers, or PRS transmitted by transmission reception points (TRPs), or combination thereof.

32. The UE of claim 21, wherein the wake-up signal is an indicator in a downlink control information (DCI) message, wherein the UE performs A) remain in the DRX sleep mode and not receive the PRS, B) transition to the DRX ON mode to receive the PRS but not monitor for the communication signals, or C) transition to the DRX ON mode to receive the PRS and monitor for the communication signals based on information associated with the wake-up signal in the DCI message.

33. The UE of claim 32, wherein the information associated with the wake-up signal in the DCI message is a joint bitfield with a channel state information (CSI) request or CSI-reference signal (RS) triggering or a combination thereof, or is a dedicated bitfield for indicating whether the UE performs A) remain in the DRX sleep mode and not receive the PRS, B) transition to the DRX ON mode to receive the PRS but not monitor for the communication signals, or C) transition to the DRX ON mode to receive the PRS and monitor for the communication signals.

34. The UE of claim 21, wherein the at least one processor is further configured to:
receive, via the transceiver, one or more of a message from the serving base station, a message from a location server, or a combination thereof, that configures the UE to perform A) remain in the DRX sleep mode and not receive the PRS, B) transition to the DRX ON mode to receive the PRS but not monitor for the communication signals, or C) transition to the DRX ON mode to receive the PRS and monitor for the communication signals.

35. The UE of claim 34, wherein the message from the location server configures the UE to transition to the DRX ON mode to receive the PRS in response to the wake-up signal indicating that the UE is not to wake up, and the message from the serving base station configures the UE to not monitor for the communication signals or to monitor for the communication signals.

36. The UE of claim 21, wherein the wake-up signal indicating that the UE is not to wake up during the next ON time during the DRX cycle to monitor for data signals or control signals is provided to a location server from the serving base station.

37. The UE of claim 36, wherein the at least one processor is further configured to receive a DRX configuration from the serving base station, wherein the DRX configuration is provided to the location server from the serving base station.

38. The UE of claim 36, wherein the serving base station provides to the location server an indication of when the UE is configured to monitor for the wake-up signal and when the wake-up signal is ON or OFF.

39. The UE of claim 21, wherein the at least one processor is further configured to transmit a report to a location server of receipt of the wake-up signal indicating that the UE is not to wake up during the next ON time during the DRX cycle.

40. The UE of claim 39, wherein the report of the receipt of the wake-up signal is a positioning measurement report.

41. A method of wireless communication for a user equipment (UE) operating in a discontinuous reception (DRX) mode performed by a base station in a wireless network serving the UE, comprising:
transmitting to the UE a wake-up signal indicating that the UE is not to wake up during a next ON time during a DRX cycle to monitor for communication signals, the communication signals comprising data signals or control signals or both;
wherein the UE is configured to receive positioning reference signals (PRSs), and in response to the configuration to receive the (PRSs) and the wake-up signal, the UE performs one of:
A) remaining in a DRX sleep mode and not receiving the PRS; or
B) transitioning to a DRX ON mode to receive the PRS but not monitoring for the communication signals; or
C) transitioning to the DRX ON mode to receive the PRS and monitoring for the communication signals;
transmitting to a location server an indication of the wake-up signal indicating that the UE is not to wake up during the next ON time during the DRX cycle to monitor for the communication signals.

42. The method of claim 41, further comprising:
transmitting a DRX configuration to the UE;
transmitting the DRX configuration to the location server.

43. The method of claim 41, further comprising:
transmitting to the location server an indication of when the UE is configured to monitor the wake-up signal and when the wake-up signal is ON or OFF.

44. A base station in a wireless network serving a user equipment (UE), the UE configured for wireless communication and operating in a discontinuous reception (DRX) mode, comprising:
a transceiver for wirelessly receiving and sending messages with UEs;
a communication interface for receiving and sending messages to entities within the wireless network;
at least one memory; and at least one processor coupled to the transceiver, the communication interface, and the at least one memory, the at least one processor configured to:
transmit to the UE, via the transceiver, a wake-up signal indicating that the UE is not to wake up during a next ON time during a DRX cycle to monitor for communication signals, the communication signals comprising data signals or control signals or both;
wherein the UE is configured to receive positioning reference signals (PRSs), and in response to the configuration to receive the (PRSs) and the wake-up signal, the UE performs one of:
A) remaining in a DRX sleep mode and not receiving the PRS; or
B) transitioning to a DRX ON mode to receive the PRS but not monitoring for the communication signals; or
C) transitioning to the DRX ON mode to receive the PRS and monitoring for the communication signals; transmit to a location server, via the communications interface, an indication of the wake-up signal indicating that the UE is not to wake up during the next ON time during the DRX cycle to monitor for the communication signals.

45. The base station of claim 44, wherein the at least one processor is further configured to:
transmit, via the transceiver, a DRX configuration to the UE;
transmit, via the communications interface, the DRX configuration to the location server.

46. The base station of claim 44, wherein the at least one processor is further configured to:
 transmit to the location server, via the communications interface, an indication of when the UE is configured to monitor the wake-up signal and when the wake-up signal is ON or OFF.

\* \* \* \* \*